(12) United States Patent
Behre et al.

(10) Patent No.: US 12,469,490 B2
(45) Date of Patent: Nov. 11, 2025

(54) STREAMING PUNCTUATION FOR LONG-FORM DICTATION

(71) Applicant: MICROSOFT TECHNOLOGY LICENSING, LLC, Redmond, WA (US)

(72) Inventors: Piyush Behre, Santa Clara, CA (US); Sharman W Tan, Fremont, CA (US); Shuangyu Chang, Davis, CA (US); Padma Varadharajan, San Jose, CA (US); Sayan Dev Pathak, Kirkland, WA (US); Ravikant Gupta, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 343 days.

(21) Appl. No.: 17/732,971

(22) Filed: Apr. 29, 2022

(65) Prior Publication Data

US 2023/0352009 A1 Nov. 2, 2023

(51) Int. Cl.
| | | |
|---|---|---|
| *G10L 15/19* | (2013.01) | |
| *G06F 40/103* | (2020.01) | |
| *G06F 40/232* | (2020.01) | |
| *G06F 40/58* | (2020.01) | |
| *G10L 15/04* | (2013.01) | |
| *G10L 15/22* | (2006.01) | |

(52) U.S. Cl.
CPC ............ *G10L 15/19* (2013.01); *G06F 40/103* (2020.01); *G06F 40/58* (2020.01); *G10L 15/04* (2013.01); *G10L 15/22* (2013.01)

(58) Field of Classification Search
CPC ......... G10L 15/19; G10L 15/04; G10L 15/22; G10L 15/26; G06F 40/103; G06F 40/58; G06F 40/232; G06F 40/279
See application file for complete search history.

(56) References Cited

U.S. PATENT DOCUMENTS

| | | |
|---|---|---|
| 6,778,958 B1 | 8/2004 | Nishimura et al. |
| 6,985,863 B2 | 1/2006 | Itoh et al. |
| 8,972,268 B2 * | 3/2015 | Waibel .................... G10L 15/06 704/277 |

(Continued)

FOREIGN PATENT DOCUMENTS

| | | | | |
|---|---|---|---|---|
| CN | 109255115 A | * | 1/2019 | .......... G06F 40/166 |
| CN | 109558576 A | | 4/2019 | |

(Continued)

OTHER PUBLICATIONS

Qian Chen, Mengzhe Chen, Bo Li, and Wen Wang, "Controllable Time-Delay Transformer for Real-Time Punctuation Prediction and Disfluency Detection," ICASSP 2020, 2020 IEEE Conference, May 4, 2020, pp. 8069-8073 (Year: 2020).*

(Continued)

*Primary Examiner* — Paras D Shah
*Assistant Examiner* — Mulugeta Tuji Dugda
(74) *Attorney, Agent, or Firm* — Workman Nydegger

(57) ABSTRACT

Systems generate segments of spoken language utterances based on different sets of segmentation boundaries. The systems are also configured to generate one or more formatted segments by assigning a punctuation tags at segmentation boundaries and to generate one or more final sentences from the one or more segments.

23 Claims, 11 Drawing Sheets

(56) References Cited

U.S. PATENT DOCUMENTS

| | | | |
|---|---|---|---|
| 11,093,110 B1* | 8/2021 | Bossio | G10L 15/26 |
| 11,900,072 B1* | 2/2024 | Bossio | G06F 3/04883 |
| 2002/0099717 A1* | 7/2002 | Bennett | G06F 40/174 |
| | | | 707/999.102 |
| 2016/0132465 A1* | 5/2016 | Marks | G06F 40/103 |
| | | | 715/235 |
| 2018/0349336 A1* | 12/2018 | German | G09B 5/02 |
| 2022/0415307 A1* | 12/2022 | Kockerbeck | G10L 15/183 |

FOREIGN PATENT DOCUMENTS

| | | |
|---|---|---|
| CN | 112712804 A | 4/2021 |
| CN | 112926302 A | 6/2021 |
| CN | 114120975 A | 3/2022 |

OTHER PUBLICATIONS

Thai Binh Nguyen, Phuong Pham, Hien Nguyen, and The Loc Nguyen, "Fast and Accurate Capitalization and Punctuation for Automatic Speech Recognition Using Transformer and Chunk Merging," IEEE Conference Paper, Oct. 2019 (Year: 2019).*

Chen, et al., "Controllable Time-Delay Transformer for Real-Time Punctuation Prediction and Disfluency Detection", In Proceedings of International Conference on Acoustics, Speech and Signal Processing, May 4, 2020, pp. 8069-8073.

Nguyen, et al., "Fast and Accurate Capitalization and Punctuation for Automatic Speech Recognition Using Transformer and Chunk Merging", In Proceedings of 22nd Conference of the Oriental COCOSDA International Committee for the Co-ordination and Standardisation of Speech Databases and Assessment Techniques, Oct. 25, 2019, 5 Pages.

"International Search Report and Written Opinion Issued in PCT Application No. PCT/US23/013443", Mailed Date: May 11, 2023, 10 Pages.

González-Docasal, et al., "AutoPunct: A Bert-Based Automatic Punctuation and Capitalisation System for Spanish and Basque", In Journal of Procesamiento del Lenguaje Natural, vol. 67, Sep. 2021, pp. 59-68.

Hori, et al., "Transformer-based Long-context End-to-end Speech Recognition", In Proceedings of Annual Conference of the International Speech Communication Association (Interspeech), Oct. 24, 2020, 5 Pages.

Miaschi, et al., "Evaluating Transformer Models for Punctuation Restoration in Italian", In Proceedings of 5th Workshop on Natural Language for Artificial Intelligence, Nov. 29, 2021, 14 Pages.

Urban, et al., "How to use batch transcription", Retrieved from: https://docs.microsoft.com/en-us/azure/cognitive-services/speech-service/batch-transcription, Apr. 5, 2022, 13 Pages.

* cited by examiner

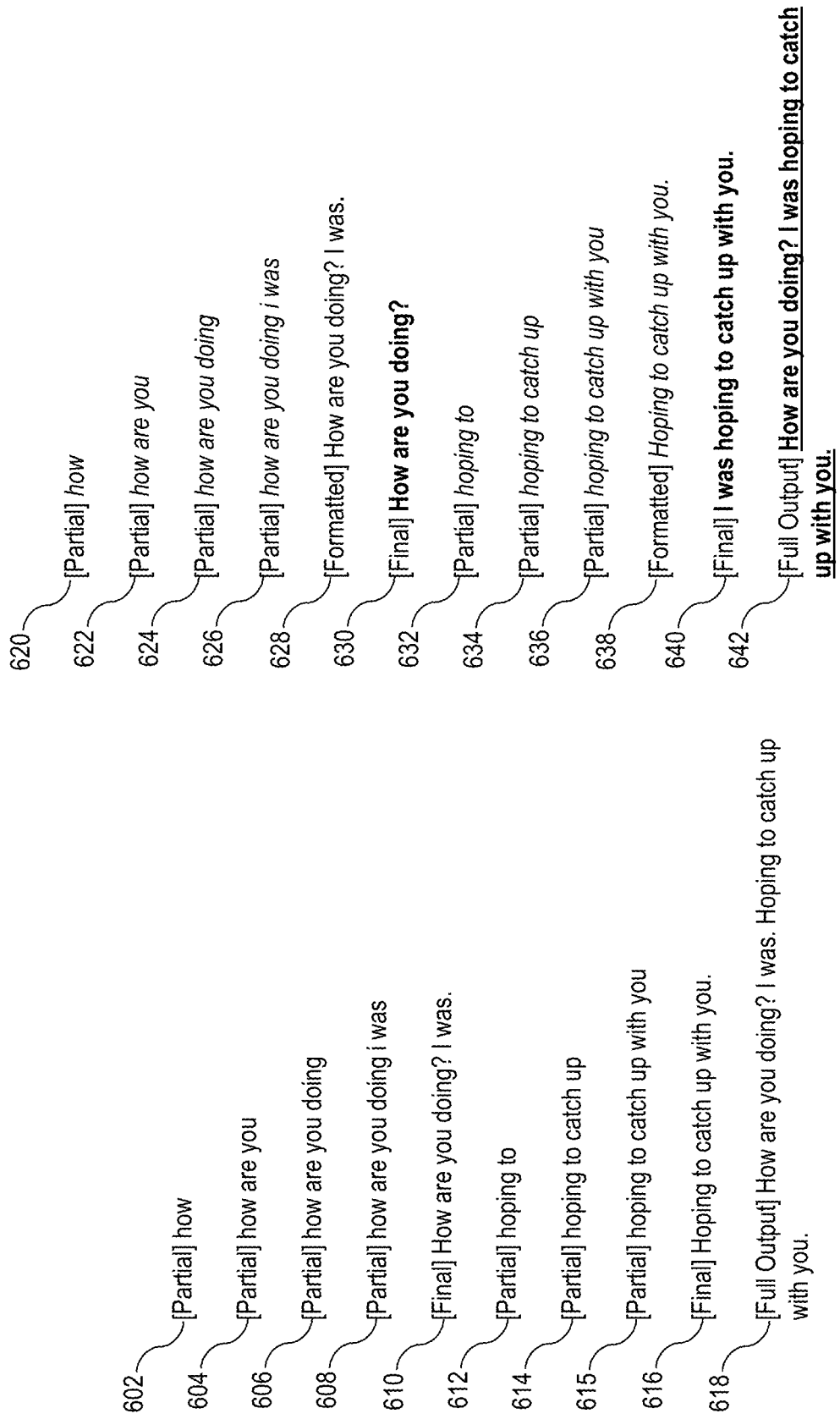

800

810 — Generating one or more decoder segments of the one or more spoken language utterances based on a first set of segmentation boundaries which are configured as temporary segmentation boundaries, each decoder segment comprising one or more consecutive words recognized in the speech data 820 — Generating one or more formatted segments based on the one or more decoder segments by assigning a punctuation tag selected from a plurality of punctuation tags at each segmentation boundary included in the first set of segmentation boundaries 830 — Generating a second set of segmentation boundaries such that at least one segmentation boundary included in the second set of segmentation boundaries is determined to be a final segmentation boundary corresponding to an end of a sentence included in the one or more spoken language utterances 840 — Applying the second set of segmentation boundaries to the one or more decoder segments 850 — In response to applying the second set of segmentation boundaries to the one or more decoder segments, generating one or more final sentences from the one or more decoder segments.

*FIG. 8*

STREAMING PUNCTUATION FOR LONG-FORM DICTATION

BACKGROUND

Automatic speech recognition (ASR) systems and other speech processing systems are used to process and decode audio data to detect speech utterances (e.g., words, phrases, and/or sentences). The processed audio data is then used in various downstream tasks such as search-based queries, speech to text transcription, language translation, etc. Oftentimes, the processed audio data needs to be segmented into a plurality of audio segments before being transmitted to downstream applications, or to other processes in streaming mode.

Conventional systems are configured to perform audio segmentation for continuous speech today based on timeout driven logic. In such speech recognition systems, for example, audio is segmented after a certain amount of silence has elapsed at the end of a detected word (i.e., when the audio has "timed-out"). Conventional time-out-based segmentation does not adequately compensate for very slow speakers or address the fact that a speaker may introduce a pause, midsentence, for dynamic effect or while considering what to say next. Consequently, the segmentation of the spoken utterance may occur too soon, prior to the natural end of a grammatical sentence. Such processing can degrade the overall consumer experience, as well as the quality of transcribed output for subsequent data consumption by downstream post-processing components, such as, for example, punctuators or machine translation components. Consequently, grammatical errors are introduced into the resulting transcriptions.

It is noted that some conventional systems and methods have been developed to include neural network-based models that combined current acoustic information and the corresponding linguistic signals for improving segmentation. However, even such approaches, while superior to time-out-based logic, are still found to over-segment the audio leading to some of the same issues mentioned above.

In view of the foregoing, there is an ongoing need for improved systems and methods for performing speech translation services. The subject matter claimed herein is not limited to embodiments that solve any disadvantages or that operate only in environments such as those described above. Rather, this background is only provided to illustrate one exemplary technology area where some embodiments described herein may be practiced.

SUMMARY

Disclosed embodiments include systems, methods, and devices for generating transcription data for speech data comprising one or more spoken language utterances.

Disclosed systems are configured to apply layered segmentation processing, which can be utilized to facilitate and enhance the punctuation and grammatical formatting of transcriptions for natural speech.

Some systems, for example, are configured to generate one or more decoder segments of one or more spoken language utterances based on a first set of segmentation boundaries which are configured as initial or temporary segmentation boundaries. Each decoder segment comprising one or more consecutive words recognized in the speech data. The systems are also configured to generate one or more formatted segments based on the one or more decoder segments by assigning a punctuation tag selected from a plurality of punctuation tags at each segmentation boundary included in the first set of segmentation boundaries and generate a second set of segmentation boundaries such that at least one segmentation boundary included in the second set of segmentation boundaries is determined to be a final segmentation boundary corresponding to an end of a sentence included in the one or more spoken language utterances. The systems then apply the second set of segmentation boundaries to the one or more decoder segments. In response to applying the second set of segmentation boundaries to the one or more decoder segments, the systems generate one or more final sentences from the one or more decoder segments.

Disclosed systems are also configured transmit (i) an initial partial segment comprising one or more initial words recognized from the input speech and (ii) one or more additional partial segments, each additional partial segment comprising the initial partial segment and one or more additional words which are recognized subsequent to the one or more initial words, and which are appended to a previously generated partial segment. Subsequently, systems transmit a formatted segment that has been generated by at least identifying and applying a first set of segmentation boundaries to the one or more additional partial segments and applying a punctuation for each segmentation boundary included in the first set of segmentation boundaries. The systems are also configured to transmit a final segment that has been generated by at least identifying and applying a second set of segmentation boundaries to the one or more additional partial segments, wherein the final segment comprises at least one complete sentence that includes one or more additional partial segments, and which overlaps at least a portion of the formatted segment. This process is, optionally, repeated until all of the input speech is consumed by the automatic speech recognition system.

Some disclosed embodiments are also directed to client-side systems and methods for receiving transcription data for input speech recognized by an automatic speech recognition model. Such systems are configured to receive at least one partial segment comprising one or more words recognized from the input speech. Subsequently, systems receive a formatted segment that has been generated based on the at least one partial segment by at least identifying a first set of segmentation boundaries associated with the at least one partial segment and generating a punctuation mark for each segmentation boundary included in the first set of segmentation boundaries. The systems also receive a final segment that has been generated by at least identifying a second set of segmentation boundaries associated with the at least one partial segment, wherein the final segment overlaps at least a portion of the formatted segment.

After receiving the formatted segment and the final segment, the systems are configured to determine whether the second set of segmentation boundaries is different than the first set of segmentation boundaries. In response to determining that the second set of segmentation boundaries is not different than the first set of segmentation boundaries, the systems refrain from modifying a grammatical punctuation associated with the formatted segment, or alternatively, in response to determining that the second set of segmentation boundaries is different from the first set of segmentation boundaries, the systems modify the grammatical punctuation associated with the formatted segment based on the second set of segmentation boundaries such that the portion of the formatted segment that overlaps the final segment is replaced by the final segment.

The various segments generated by the different segmentation boundaries are streamed back to the user, for dynamic display in real-time, as the segments are created and the punctuation is applied and/or corrected.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be limiting in scope, embodiments will be described and explained with additional specificity and detail through the use of the accompanying drawings in which:

FIGS. 6A-6B illustrate an example of streaming automatic speech recognition output including partial segments, formatted segments, final segments, and full outputs as generated by a conventional ASR system (see, FIG. 6A) and as generated by a transformer-based ASR system (see, FIG. 6B).

FIG. 8 illustrates an example embodiment of a flow diagram having a plurality of acts for generating phased transcription data.

DETAILED DESCRIPTION

Figure 1:
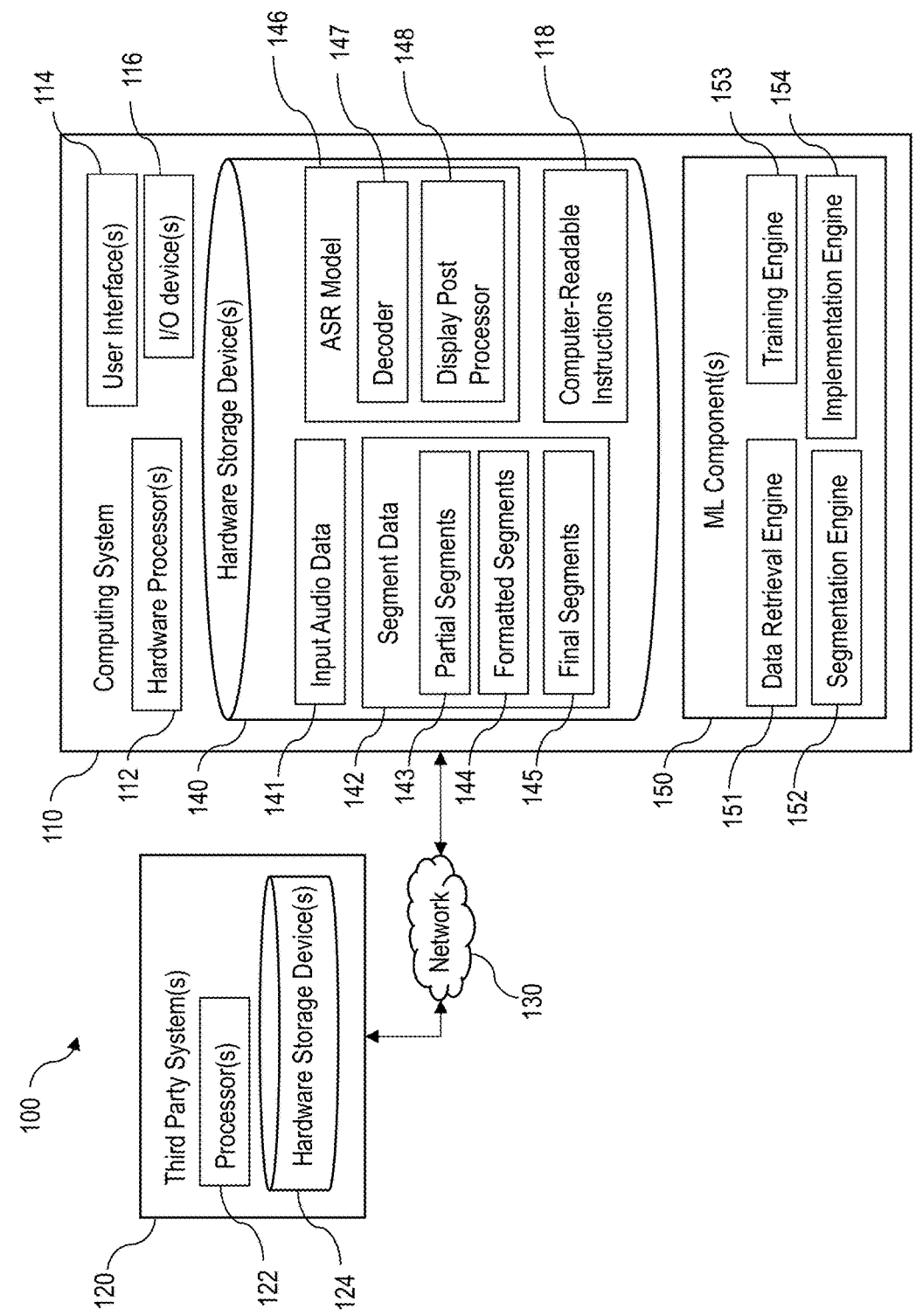
FIG. 1 illustrates a computing environment in which a computing system incorporates and/or is utilized to perform disclosed aspects of the disclosed embodiments.

Disclosed embodiments include systems, methods, and frameworks for generating phased transcription data for speech data comprising spoken language utterances. Some disclosed systems are directed to generating and transmitting phased transcription data for input speech recognized by an automatic speech recognition model. Disclosed systems are also directed to receiving and displaying phased transcription data.

Disclosed systems and methods can be utilized to facilitate many technical benefits and advantages for performing ASR processing, particularly as compared to conventional ASR systems. By way of example, the current systems utilize a layered approach for performing segmentation processing of spoken utterances, such that any errors in the initial segmentation can be identified and corrected by subsequent segmentation processing. This layered and structured correction of segmentation boundaries during the ASR processing greatly improves downstream punctuation and formatting of transcriptions based on the segmentation/punctuation logic. Accordingly, initial segmentation errors will not necessarily be propagated through the entire punctuation and/or machine translation steps of the system data processing. Instead, the initial set of segmentation boundaries are merely configured as "soft," initial or temporary segmentation boundaries that can be verified and/or overridden by subsequent segmentation boundaries generated before the final transcription is generated. With this layered approach, it is possible to generate and apply full sentence segmentation boundaries to verify/correct previous partial sentence segment. Because segments can end abruptly and erroneously due to natural or unnatural pausing, the application of full sentence segmentation boundaries (as described herein) can greatly improve the accuracy of formatting, and thus the readability of the final transcription data.

Furthermore, by utilizing a transformer-based punctuation model in order to generate the second set of segmentation boundaries, the system is able to extract context information from both the entire left and entire right side of the predicted segmentation boundary in order to more accurately generate segment breaks at actual sentence ends. Such techniques more accurately determine sentence boundaries than conventional models that do not apply bi-directional context information. Consequently, the current embodiments realize punctuation accuracy improvements over the counterpart conventional models that do not utilize transformer-based punctuation in the layered approach described herein.

With regard to the foregoing, it is noted that some conventional system may use transformer-based acoustic and language models. However, none of these conventional systems utilize or incorporate transformer-based segmentation and punctuation in their models. Consequently, these conventional systems that utilize transformer-based acoustic and language models fail to realize the foregoing benefits of layered/bi-directional segmentation in the manner that is described and claimed herein.

Attention is now be directed to FIG. 1, which illustrates components of a computing system 110 which may include and/or be used to implement aspects of the disclosed invention. As shown, the computing system includes a plurality of machine learning (ML) engines, models, neural networks, and data types associated with inputs and outputs of the machine learning engines and models.

The computing system 110 as part of a computing environment 100 that also includes third-party system(s) 120 in communication (via a network 130) with the computing system 110. The computing system 110 is configured to generate or otherwise obtain a machine learning module configured as an automatic speech recognition system (e.g., ASR model 146) configured to generate phased transcription data. The ASR model 146 comprises at least a decoder 147 and a display post processor 148. In some embodiments, the ASR model 146 is a multi-lingual ASR model capable of recognizing spoken language utterances in a variety of different languages. Alternatively, the ASR model 146 is a single language ASR model that has been trained to recognize speech in a particular language. Similarly, in some instances, the ASR model 146 is speaker-independent ASR model which is capable of recognizing speech generated by a plurality of different speakers. Additionally, or alternatively, ASR model 146 is a speaker-dependent ASR model, wherein the ASR model 146 has been adapted or fine-tuned for a particular target speaker, and/or ASR model 146 is a multi-speaker model, wherein the ASR model 146 has been adapted or fine-tuned for a plurality of different target speakers.

The computing system 110 includes one or more processor(s) (such as one or more hardware processor(s) 112) and a storage (i.e., hardware storage device(s) 140) storing computer-readable instructions 118, wherein each of the one or more of the hardware storage device(s) 140 is able to house any number of data types and any number of computer-readable instructions 118 by which the computing system 110 is configured to implement one or more aspects of the disclosed embodiments when the computer-readable instructions 118 are executed by the one or more processor(s) 112. The computing system 110 is also shown including user interface(s) 114 and input/output (I/O) device(s) 116.

As shown in FIG. 1, hardware storage device(s) 140 is shown as a single storage unit. However, it will be appreciated that the hardware storage device(s) 140 is, a distributed storage that is distributed to several separate and sometimes remote systems and/or third-party system(s) 120. The computing system 110 can also comprise a distributed system with one or more of the components of computing system 110 being maintained/run by different discrete systems that are remote from each other and that each perform different tasks. In some instances, a plurality of distributed systems performs similar and/or shared tasks for implementing the disclosed functionality, such as in a distributed cloud environment.

The storage (e.g., hardware storage device(s) 140) includes computer-readable instructions 118 for instantiating or executing one or more of the models, components, and/or engines shown in computing system 110. The models are configured as machine learning models or machine learned models, such as deep learning models and/or algorithms and/or neural networks. In some instances, the one or more models are configured as engines or processing systems (e.g., computing systems integrated within computing system 110), wherein each engine comprises one or more processors (e.g., hardware processor(s) 112) and computer-readable instructions 118 corresponding to the computing system 110. In some configurations, a model is a set of numerical weights embedded in a data structure, and an engine is a separate piece of code that, when executed, is configured to load the model, and compute the output of the model in context of the input audio.

The hardware storage device(s) 140 are configured to store and/or cache in a memory store the different data types including input audio data 141 and segment data 142, described herein.

The input audio data 141 comprises natural language recorded from one or more human speakers. The input audio data 141 may comprise background noise and/or unrecognizable sounds or speech, along with the recognizable language utterances spoken by the one or more speakers. Spoken language utterances comprise words, phrases, and sentences spoken by the one or more speakers. The input audio data 141 may also comprise spoken language utterances in one or more different languages, such that the ASR model 146 is a multi-lingual multi-speaker ASR model. The input audio data 141 is configurable as streaming audio, which is either streaming in real-time or live, or is streaming on demand. Additionally, or alternatively, the input audio data 141 is configurable as a previously recorded audio file, such as a voicemail or other recording. In some instances, the input audio data 141 is extracted from an audio-visual file.

When the input audio data 141 is configured as a previously recorded audio file, the automatic speech recognition model only transmits to the user display the entire transcript of the audio file. In some instances, the model will consume all the segments generated by the ASR model, including re-segmented transcription data in order to generate a full graph of all possible combination of segmented sentences. The system then determines which segmentation boundaries are accurate and which segmentation boundaries were incorrectly predicted. Then, the system only applies punctuation to the accurate segmentation boundaries.

Additionally, or alternatively, the input audio data 141 comprises synthesized speech. The synthesized speech comprises synthesized audio data comprising speech utterances corresponding to words, phrases, and sentences extracted from various text-based data sources. The synthesized speech comprises speech utterances in different speaker voices, different languages, different speaking styles, etc. The synthesized speech comprises speech utterances that are characterized by the encoded features (e.g., acoustic features and linguistic features). The synthesized speech is also characterized and/or customizable based on the vocoder used to process the Mel spectrum and generate the audio file (i.e., synthesized speech). In some instances, the synthesized speech is beneficially generated to mimic natural language audio.

The segment data 142 comprises text data or transcription data corresponding to spoken language utterances recognized in the input audio data 141. The text data or transcription data comprises sequences of characters, symbols, and/or numbers. The segment data 142 are configured as partial segments 143, formatted segments 144, and final segments 145. Partial segments 143 comprise one or more words, one or more phrases, a partial sentence, and/or a run-on sentence corresponding to one or more spoken language utterances recognized in the input audio data 141. The partial segments 143 are not formatted with punctuation or other grammatical construction. The formatted segments 144 comprise one or more partial segments that have been segmented according to a first set of segmentation boundaries and have been punctuated (e.g., using the display post processor 148), wherein a punctuation mark has been generated for each segmentation boundary included in the first set of segmentation boundaries. In some instances, the first set of segmentation boundaries are generated by the decoder 147, and/or more specifically a segmentation logic model included in the decoder.

The final segments 145, as will be described in more detail below, are segmented according to a second set of segmentation boundaries that are applied to one or more partial segments. In some instances, the second set of segmentation boundaries are generated by the display post processor 148, and/or more specifically a punctuation model included in the display post processor. In such instances, applying the second set of segmentation boundaries further includes simultaneously generating and applying punctuation marks for each of the segmentation boundaries included in the second set of segmentation boundaries. Thus, the final segments 145 are configured as correctly formatted sentences corresponding to complete sentences recognized in the input audio data 141. Each of the different segment data 142 is configured to be displayed on a user display (e.g., user interface 114) and/or transmitted to a downstream application such as machine translation.

An additional storage unit for storing machine learning (ML) Component(s) 150 is presently shown in FIG. 1 as storing a plurality of machine learning models, components, and/or engines. For example, computing system 110 comprises one or more of the following components: a data retrieval engine 151, a segmentation engine 152, a training engine 153, an implementation engine 154 and/or other components (e.g., translators, vocoders, etc.), which are individually and/or collectively configured to implement the different functionality described herein.

The computing system 110 is also configured with a data retrieval engine 151, which is configured to locate and access data sources, databases, and/or storage devices comprising one or more data types from which the data retrieval engine 151 can extract sets or subsets of data to be used as input audio data 141. The data retrieval engine 151 receives data from the databases and/or hardware storage devices, wherein the data retrieval engine 151 is configured to reformat or otherwise augment the received data to be consumed by the ASR model 146. Additionally, or alternatively, the data retrieval engine 151 is in communication with one or more remote systems (e.g., third-party system(s) 120) comprising third-party datasets and/or data sources. In some instances, these data sources comprise audio-visual services that translate, render, record or stream text, images, and/or video.

In some instances, the data retrieval engine 151 is configured to retrieve audio data in real-time, such that the input audio data 141 is "streaming" and being processed in real-time (i.e., a user sees the transcription data corresponding to the input audio data at the same rate as the input audio data 141 is being retrieved, recognized, and translated). In some instances, the data retrieval engine 151 is configured to retrieve a previously recorded audio file, such that the input audio data 141 is a discrete batch of audio data. In some instances, the data retrieval engine 151 is a smart engine that is able to learn optimal dataset extraction processes to provide a sufficient amount of data in a timely manner as well as retrieve data that is most applicable to the desired applications for which the machine learning models/engines will be used.

The segmentation engine 152 is configured to generate and apply segmentation boundaries. The segmentation engine 152 generates a first set of segmentation boundaries using the decoder 147. The segmentation engine 152 applies the first set of segmentation boundaries to one or more partial segments 143 in order to generate one or more decoder segments. The decoder segments are then subsequently transmitted to the display post processor 148 which generates and applies punctuation tags according to the first set of segmentation boundaries. This process results in generating formatted segments. The first set of segmentation boundaries may be generated based on a smart segmentation process or a time-out logic process. It should be appreciated that the first set of segmentation boundaries may result in decoder segments comprising sentence fragments and/or run-on sentences, wherein subsequent punctuation will be incorrect generated for the decoder segments because of any sentence breaks incorrectly predicted by the first set of segmentation boundaries. In this manner, the first set of segmentation boundaries are treated as "soft" or "temporary" segmentation boundaries which can be overridden and/or replaced by the second set of segmentation boundaries.

The segmentation engine 152 is also configured to generate a second set of segmentation boundaries using the display post processor 148. In such instances, the second set of segmentation boundaries is embedded with a set of punctuation tags. Each punctuation tag corresponds to a different segmentation boundary included in the second set of segmentation boundaries. This process results in generating final sentences. In this manner, the second set of segmentation boundaries are treated as hard boundaries which are capable of overriding or replacing the soft segmentation boundaries predicted in the first set of segmentation boundaries. Applying the second set of segmentation boundaries results in generating complete sentences (e.g., final segments 145) that are formatted with at least punctuation and capitalization.

In some configurations, a hard segmentation boundary is generated for a particular decoder segment based on looking ahead to an additional decoder segment occurring temporally subsequent to the particular decoder segment. A confidence score is calculated based on a prediction that a new sentence has started, wherein if the confidence score equals or exceeds a new sentence confidence score threshold, a new hard segmentation boundary is generated as part of the second set of segmentation boundaries.

In some instances, the segmentation engine 152 is configured to evaluate the second set of segmentation boundaries against the first set of segmentation boundaries, in order to determine which set of segmentation boundaries should be applied in order to generate a final transcription output. For example, the segmentation engine 152 may apply a combination of one or more segmentation boundaries from the first set of segmentation boundaries and one or more segmentation boundaries from the second set of segmentation boundaries to the partial segments in order to generate one or more final sentences.

It should be appreciated that a segmentation boundary refers to a prediction or marker that indicates a sentence break between two consecutive words recognized in the input audio data 141 (i.e., the temporal and/or lexical position where one sentence ends and another sentence begins). Furthermore, each set of segmentation boundaries may comprise one or more than one segmentation boundary.

The training engine 153 is configured to train the automatic speech translation model and/or the individual components to perform one or more aspects of the various embodiments disclosed herein. The training engine 153 is also configured to train an ASR model 146 which is convertible/trainable into an end-to-end automatic speech translation model.

The computing system 110 also includes an implementation engine 154, which is in communication with any one or more of the models and/or ML component(s) 150 of the computing system 110, such that the implementation engine 154 is configured to implement, initiate, or run one or more functions of the plurality of ML component(s) 150. In one example, the implementation engine 154 is configured to operate the data retrieval engine 151 so that the data retrieval engine 151 retrieves data at the appropriate time to be able to obtain input audio data 141 and/or transmit the different segment data 142. The implementation engine 154 facilitates the process communication and timing of communication between one or more of the ML component(s) 150 and is configured to implement and operate a machine learning model (or one or more of the ML component(s) 150).

The implementation engine 154 is also configured to transmit different segment data 142 to third party system(s) 120 and/or user interface(s) 114 which comprise user displays. The user displays are configured to display to a user the different segment data 142 as they are received by the system. The user interface(s) 114 are also in communication with one or more I/O device(s) 116 that are configured at least to receive user input, including streaming audio data, recorded audio, user input defining explicit segmentation boundaries and/or punctuation, and/or user input that tunes the segmentation process of the ASR model 146 to the speaker. For example, if users are slow or hesitant speakers (i.e., have a slow speaking rate and/or often corrects themselves mid-sentence), the user could signal to the system to allow for longer pauses before generating a segmentation boundary or to look ahead at more words. The user could also define different user preferences, including a preferred language for transcription and/or subsequent translation, preferred formatting for different words/numbers/dates/times.

It is also noted that the computing system 110 is in communication with third-party system(s) 120 comprising one or more processor(s) 122, one or more of the computer-readable instructions 118, and one or more hardware storage device(s) 124. Additionally, or alternatively, the third-party system(s) 120 include machine learning systems external to the computing system 110. The third-party system(s) 120 are software programs or applications.

The computing system 110, as shown, may be a standalone system (such as a server). The computing system 110 may, however, also be distributed, such as a cloud-based distributed server that provides ASR processing services. In some instances, the computing system 110 components are distributed as one or more agents/components that are instantiated and executed at a remote system, even an end user client system. In this regard, it will be appreciated that the claimed systems may take different forms, as long as they are configured to implement the disclosed functionality described herein.

By configuring and/or utilizing a computing system 110, as described above, it is possible to implement the disclosed method in a manner that provides many technical advantages over existing systems, including the ability to generate, train and utilize improved automatic speech recognition models that produce high quality speech transcription data. For example, the disclosed embodiments are directed to an automatic speech recognition model that generates accurate output transcription data with low latency and high segmentation accuracy, especially in streaming input audio data applications.

Figure 2:
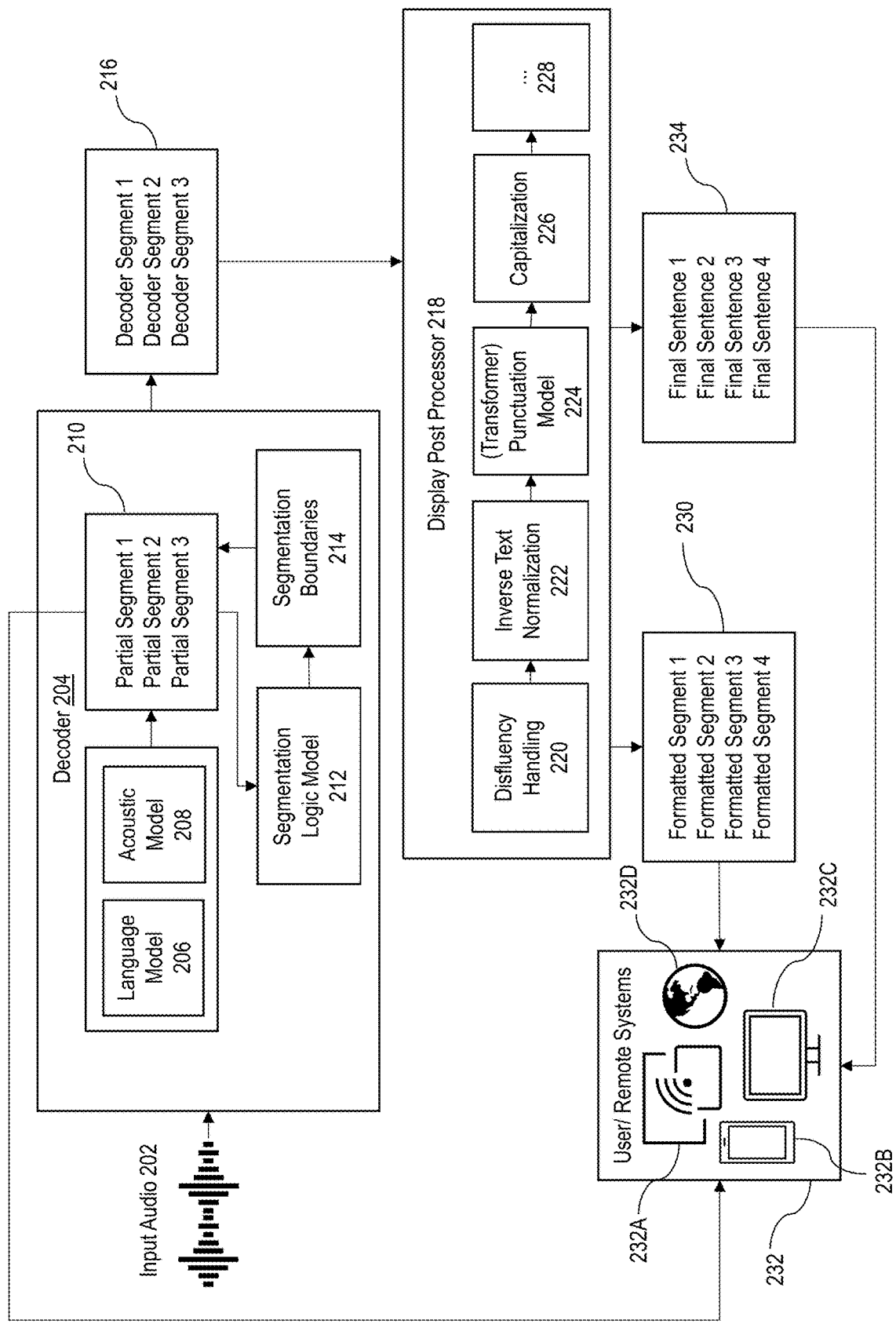
FIG. 2 illustrates an example embodiment of a process flow diagram for generating phased transcription data based on input speech.

Attention will now be directed to FIG. 2, which illustrates an example embodiment of a process flow diagram for generating phased transcription data based on input speech. For example, FIG. 2 illustrates decoder 204 being applied to input audio 202. The decoder 204 is configured to recognize spoken language utterances in continuous speech recognized in the input audio 202 and produce lexical segments (e.g., partial segments 210 and/or decoder segments 216) as output.

The decoder 204 comprises a language model 206, an acoustic model 208, and a segmentation logic model 212. The decoder 204 outputs a plurality of partial segments 210 (e.g., partial segment 1, partial segment 2, partial segment 3, and so on) as words and phrases are recognized in the input audio 202. The partial segments 210 are transmitted one by one to user/remote systems 232, including at least a user display.

The remote systems 232 comprise a plurality of different systems, including user devices (e.g., mobile devices 232B and computer devices 232C), translation systems 232D, and/or API systems 232A. The translation systems 232D are configured to consume final segments generated by the automatic speech recognition model and/or a final transcript comprising all of the final segments associated with the input audio data. When final segments are transmitted to the translation systems, each final segment is translated into a new language in the order each final segment is received by the translation system.

Because the final segments are complete sentences, the translation systems 232D are able to generate high quality translated sentences. Similarly, where an entire transcript comprising final segments is transmitted to the translation systems 232D, the systems are configured to generate a translated transcript which also is a high-quality transcript because of the re-formatted transcription data included in the transcript.

In some instances, the partial segments are generated frequently and change as more input audio is received. These partial segments are subsequently finalized by the segmentation logic model 212 based on a first set of segmentation boundaries generated by the segmentation logic model 212 prior to being transmitted to the display post processor 218. Thus, the decoder segments 216 are configured as finalized partial segments according to soft segmentation boundaries (i.e., the first set of segmentation boundaries).

The display post processor 218 is configured to generate formatted segments 230 based on generating at least a punctuation tag (e.g., using the punctuation model 224) for each of the segmentation boundaries included in the first set of segmentation boundaries that were applied to the partial segments 210 in order to generate the decoder segments 216. The formatted segments 230 are transmitted one by one in the order in which they are generated to the user/remote systems 232. Each formatted segment 230 is displayed on a user display.

In some instances, the decoder 204 is configured to output the first set of segmentation boundaries (e.g., segmentation boundaries 214) associated with the partial segments 210, wherein the first set of segmentation boundaries and the corresponding partial segments 210 are transmitted to the display post processor 218. The partial segments 210 are then processed one by one in the order in which they are received by the display post processor 218 which generates formatted segments 230 based applying the first set of segmentation boundaries 214 to the partial segments 210 using the punctuation model 224. The formatted segments 230 are also transmitted to the remote systems 232 and/or the user display.

The display post processor 218 comprises different processing and formatting models (e.g., a disfluency handling model 220 that removes "filler words" such as "uh", "uhm", "hmm" or other repletion type disfluencies from the partial segments). The display post processor 218 also comprises an inverse text normalization model 222 which is configured to format time, money, addresses, acronyms, date, phone numbers, emails, and other types of words/phrases that correspond to a particular text representation. The display post processor 218 further comprises a punctuation model 224 which is configured as a transformer-based punctuator.

The punctuation model 224 is configured to generate punctuation tags (e.g., periods, questions, commas) in the speech segments. The punctuation model 224 is configured as a transformer-based punctuator. Additionally, or alternatively, the punctuation model 224 is configured as an LSTM based model. In some instances, the formatted segments 230 include punctuation generated by an LSTM based punctuation model and the final sentences 234 include punctuation generated by a transformer-based punctuation model.

In some instances, the formatted segments 230 and final sentences 234 both include punctuation generated by a same type of punctuation model (e.g., either the transformer-based punctuation model, or the LSTM model or another type of punctuation model). In alternative embodiments, the formatted segments 230 have punctuation applied by a first type of punctuation model and the final segments/sentences 234 have punctuation applied by a different type of punctuation model that was used for generating punctuation for the formatted segments 230.

It is noted that the display post processor 218 also comprises other types of formatting models such as a capitalization model 226 which is configured to capitalize the segments correctly (e.g., to mark the beginning of a new sentence, proper names, countries, languages, etc.). The display post processor 218 may also comprise additional components 228 which further format the decoder segments in order to generate either the formatted segments 230 and/or the final sentences 234.

As the display post processor 218 receives additional decoder segments 216, it is further configured to generate a second set of segmentation boundaries (and/or a set of corresponding punctuation tags) using the punctuation model 224. Thus, any segmentation boundaries embedded in the decoder segments 216 may be overridden, such that the second set of segmentation boundaries is used to generate one or more final sentences 234 from the decoder segments 216. The final sentences 234 are then transmitted to the user/remote systems 232, wherein each final sentence is displayed as they are generated. In some embodiments, only the final sentences are transmitted to the remote systems 232, wherein the user only views transcription data that has been formatted and subsequently re-formatted according to the second set of segmentation boundaries and set of punctuation tags generated by the punctuation model 224.

Alternatively (not shown in FIG. 2), the partial segments 210 are transmitted to display post processor 218, wherein the second set of segmentation boundaries and set of corresponding punctuation tags are generated and applied directly to the partial segments 210 in order to generate the final sentences 234. It should be appreciated that while batches of segments are shown being transmitted, the system is also configured to transmit individual segments. In such configurations, the user display will show partial segments displayed among formatted segments and final segments, as the different segment data are transmitted in the order in which they are generated.

When the different segments are transmitted to the remote systems 232, the segments can be transmitted with corresponding metadata that explicitly identified what type of formatting stage/phase the segment is (e.g., an initial or partial segment, a formatted segment, a final segment/sentence, etc.). Alternatively, the receipt of a new segment that includes content from a previous segment can inferentially reflect what the status/type of the segment/sentence it is, without requiring explicit metadata. Either way, as mentioned below, the determined type/status of the segment can be used to control how the corresponding text of that segment is formatted and displayed at the user device to distinguish and/or otherwise differentiate the type of text and punctuation that is being displayed (e.g., the initial formatting for a partial or formatted segment and/or the final formatting for a final segment/sentence).

Figure 3:
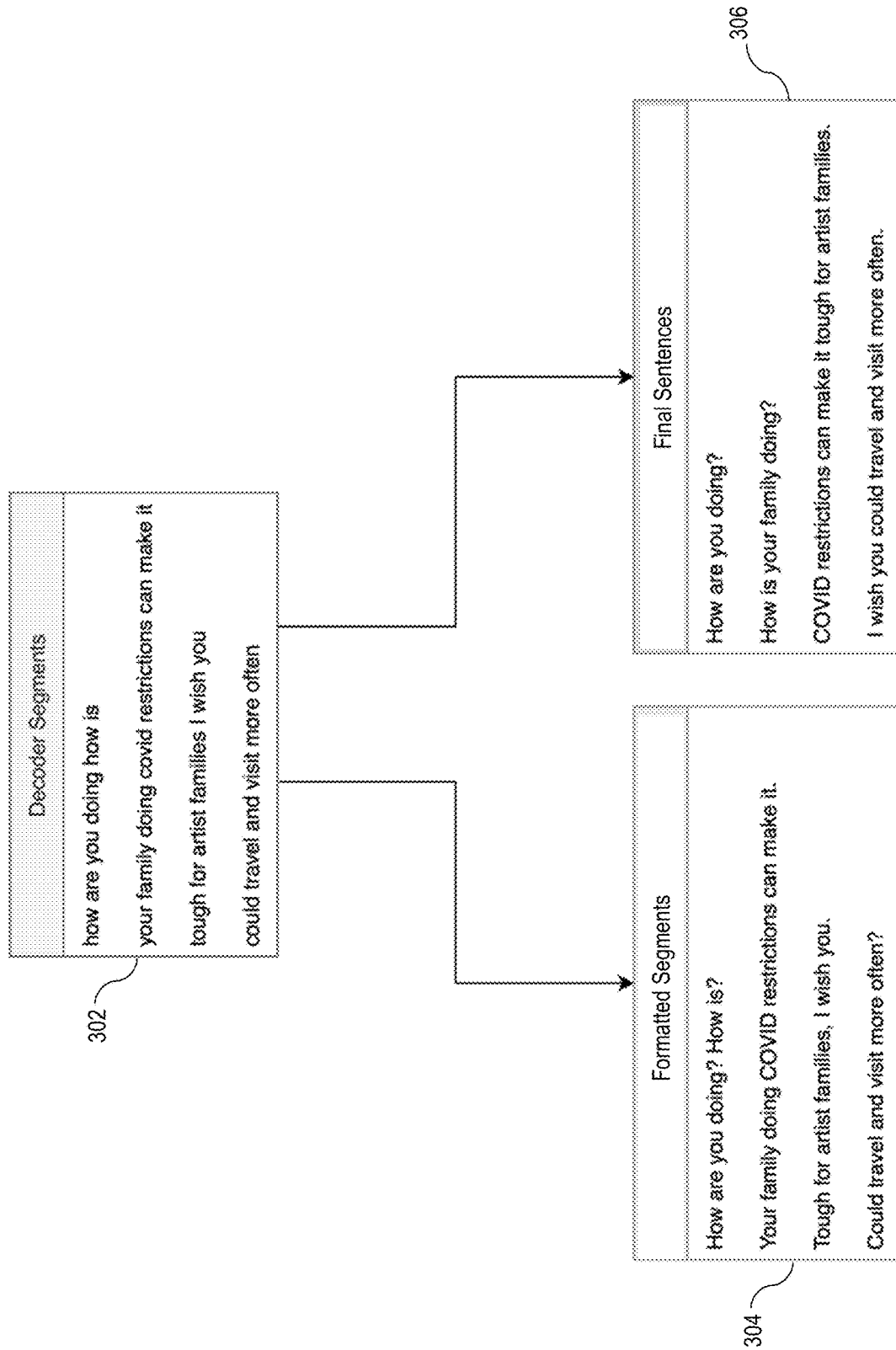
FIG. 3 illustrates an example of batched automatic speech recognition output including decoder segments, formatted segments, and final sentences.

Attention will now be directed to FIG. 3, which illustrates an example of segments including decoder segments 302 which are representative of decoder segments 216, formatted segments 304 which are representative of formatted segments 230, and final sentences 306 which are representative of final sentences 234. These decoder segments 302 are partial segments that have been finalized based on a first set of segmentation boundaries and comprise words and phrases that have been recognized in input speech (e.g., input audio 202). These words and phrases form sentence fragments and/or run-on sentences that do not have any punctuation. For example, "how are you doing how is" corresponds to decoder segment 1, "your family doing covid restrictions can make it" corresponds to decoder segment 2, "tough for artist families i wish you" corresponds to decoder segment 3, and "could travel and visit more often" corresponds to decoder segment 4.

The formatted segments 304 are decoder segments that have been formatted according to the initial application of segmentation boundaries, wherein punctuation has been generated for each of the segmentation boundaries. For example, "How are you doing? How is?" corresponds to formatted segment 1, "Your family doing COVID restrictions can make it." corresponds to formatted segment 2, "Tough for artist families, I wish you." corresponds to formatted segment 3, and "Could travel and visit more often?" corresponds to formatted segment 4.

Thus, while formatted segments 304 include punctuation and capitalization, the results may still comprise sentence fragments and/or run-on sentences, as the first set of segmentation boundaries may have predicted incorrect sentence breaks. For example, the first set of segmentation boundaries associated with decoder segment 1 predicted a sentence break between "doing" and "how". Consequently, the punctuation model 224 generated a punctuation tag comprising a question mark for the segmentation boundary between "doing" and "how". The first set of segmentation boundaries associated with decoder segment 1 also predicted a sentence break after "is". Thus, the punctuation model 224 generated a punctuation tag comprising a question mark for the segmentation boundary after "is". While the first punctuation mark is correct, the second segmentation boundary was incorrectly predicted as the speaker had not finished the next sentence.

In order to correct this, one or more decoder segments are transmitted to the punctuation model 224, wherein the punctuation model 224 generates a second set of segmentation boundaries, including a corresponding set of punctuation tags. When the punctuation marks corresponding to the punctuation tags are generated, the display post processor 218 generates one or more final sentences 306. For example, "How are you doing?" corresponds to final sentence 1, "How is your family doing?" corresponds to final sentence 2, "COVID restrictions can make it tough for artist families." corresponds to final sentence 3, and "I wish you could travel and visit more often." corresponds to final sentence 4.

While formatted segment 1 (i.e., "How are you doing? How is?") is based on the first set of segmentation boundaries corresponding to decoder segment 1 (i.e., "how are you doing how is"), final sentence 1 is based on the second set of segmentation boundaries which includes final segmentation boundaries that correspond to the actual end of sentences. These final segmentation boundaries are generated only when the system is confident that a new sentence has started. Thus, where the system initially would not be able to generate a high enough confidence score for a segmentation boundary after "is" based on decoder segment 1, the system is able to generate a final segmentation boundary after "doing" because "How is" is more likely than not a start of a new sentence.

As shown in FIG. 3, some of the initially predicted segmentation boundaries in the first set of segmentation boundaries predicted a sentence break correctly. For example, as shown in FIG. 3, formatted segments 304 comprises: "How are you doing?" which was correctly predicted from the initial segment, "how are you doing how is," in the decoder segments 302. Thus, "How are you doing?" is also seen in the final sentences 306. However, the system initially predicted a sentence break after "how is" in the initial segment of the decoder segments 302, which was incorrect. Thus, while formatted segments 304 shows "How are you doing? How is?" with a subsequent segment comprising "Your family doing COVID restrictions can make it.", the final sentences 306 comprise "How are you doing?" and "How is your family doing?" which are now correctly segmented according to the second set of segmentation boundaries. The punctuation and capitalization accuracy are improved because of the improved segmentation boundaries.

Figure 4:
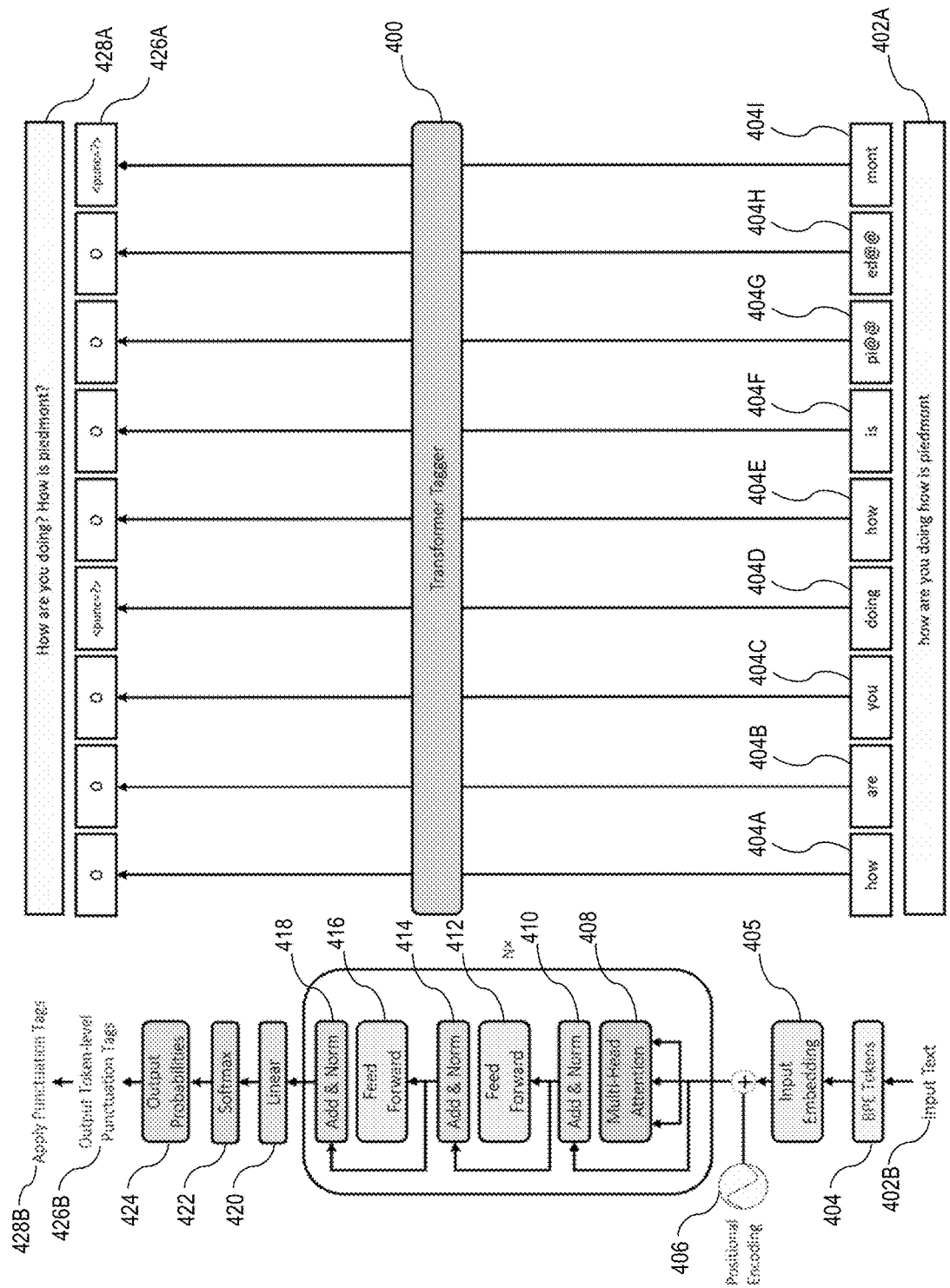
FIGS. 4A-4B illustrates example embodiments of the transformer punctuation model, for example the transformer punctuation model depicted in FIG. 2.

Attention will now be directed to FIGS. 4A-4B, which illustrates example embodiments of a transformer punctuation model (e.g., transformer tagger 400), for example punctuation model 224 as depicted in FIG. 2. As shown in FIG. 4A, a transformer tagger 400 is shown being configured to receive input data comprising input text 402A (i.e., "how are you doing how is piedmont") which is unformatted and unsegmented. The input text 402A are converted to a plurality of BPE tokens which each represent an individual word. For example, token 404A represents "how", token 404B represents "are", token 404C represents "you", token 404D represents "doing", token 404E represents "how", token 404F represents "is", token 404G represents "pi@@", token 404H represents "ed@@", and token 404I represents "mont".

With regard to the current example, it is noted that the word piedmont is a rare term. Because of this, the system may not have previously seen such a term and, upon making that determination, the system can break the term down into multiple byte-pair encoding (bpe) units. By breaking rare terms down into more frequent sub-words, the system/ models will be able to generate and utilize tokens at the sub-level. In this example, and by using the sub-words, the @ sign indicates that there is continuation of the corresponding sub-word into the next one, to form a complete word, such that several tokens have been predicted, including accounting for possible additional letters not recognized by the system, and as indicated by the inclusion of various @ sign While the use of bpe units is not required, modeling with bpe units has some advantages, like still being apply models on words which the system hasn't seen before. It can also help reduce the overall vocabulary size (250k→32k) and the correspondingly required model size of the modeling system, as well, making it more efficient for hosting the model on production servers or on-device.

The tokens are processed by the transformer tagger 400 which outputs a plurality of token level punctuation tags 426A, wherein a single punctuation tag corresponds to an individual token. The punctuation tags are selected from a plurality of punctuation tags, including a no punctuation tag "o" indicating that no punctuation should be generated after a particular token, a question mark, a period, and/or a comma. Other types of punctuation tags are also applicable including exclamation marks, colons, semi-colons, dashes, brackets, parenthesis, and/or other grammatical punctuation marks. The system then applies each of the punctuation tags in order to generate either a formatted segment where the input text has been previously labeled with segmentation boundaries and punctuation tags are generated for each of the segmentation boundaries or a final sentence where the display processor overrides any previous segmentation boundaries associated with the input text and generates new punctuation tags according to a second set of segmentation boundaries.

FIG. 4A illustrates an embodiment where the transformer tagger 400 simultaneously generates segmentation boundaries and punctuation tags based on input text that has been stripped of any previously marked segmentation boundaries. For example, the transformer tagger 400 predicts no punctuation after "how" which indicates no segmentation boundary, no punctuation after "are" which indicates no segmentation boundary, and no punctuation tag after "you" which indicates no segmentation boundary. In contrast, the transformer tagger assigns a question mark punctuation tag after "doing" indicating a segmentation boundary (i.e., the transformer tagger 400 is predicting that "doing" is the last word of a sentence and should end in a question mark).

Attention will now be directed to FIG. 4B which illustrates a more detailed illustration of the transformer tagger 400. For example, input text 402B is converted into BPE token 404. The BPE tokens 404 are processed in order to generate input embeddings 405. A positional encoding 406 is applied before the embeddings are processed by a plurality of transformer layers including a multi-head attention layer 408, an add & norm layer 410, a feed forward layer 412, another add & norm layer 414, another feed forward layer 416, and a final add & norm layer 418. After being processed by the various transformer layers, a linear layer 420 is applied, as well as a Softmax layer 422. The model the output probabilities 424 that predict whether a segmentation boundary and therefore a punctuation tag should be generated for a particular token. Based on the output probabilities, the transformer tagger 400 generates a plurality of output token-level punctuation tags 426B. The punctuation tags can then be applied to the input text (e.g., apply punctuation tags 428B) in order to generate the final sentences 428A.

Figure 5:
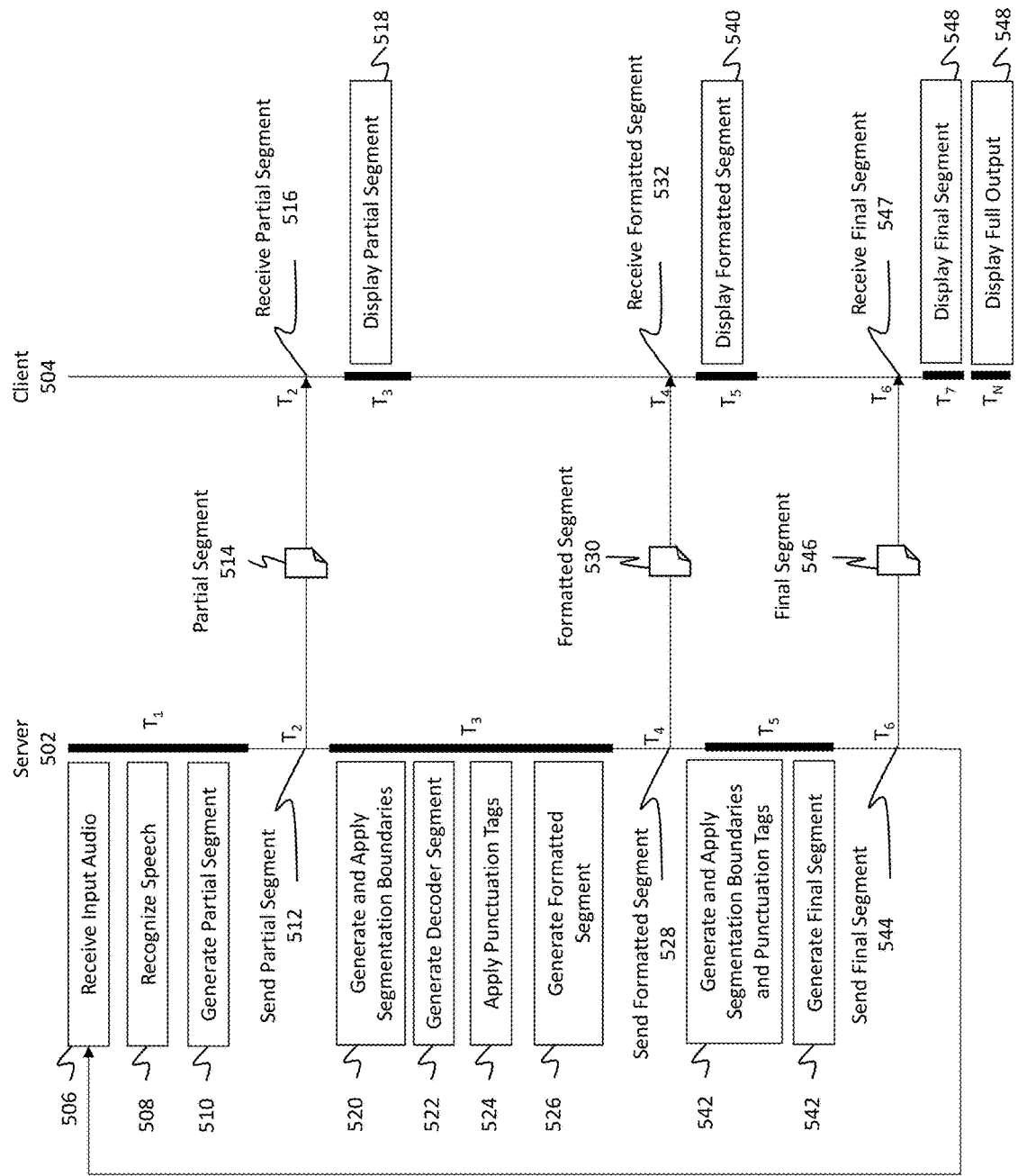
FIG. 5 illustrates an example embodiment of a process flow diagram for generating phased transcription data between a computing system comprising a server and a client.

Attention will now be directed to FIG. 5, which illustrates an example embodiment of a process flow diagram for generating phased transcription data between a computing system comprising a server and a client. Server 502 and client 504 are in communication. At T1 (time period/instance 1), the server 502 receives input speech (act 506) and recognizes spoken language utterances in the input speech, such as words and phrases (act 508). The server 502 then generates a partial segment (act 510) comprising some initial words recognized in the input audio. After generating the partial segment, the server 502 is configured to transmit the partial segment 514 (act 512) to the client 504, wherein the client 504 receives the partial segment 514 (act 516). Once the client 504 receives the partial segment 514, the client 504 is configured to display the partial segment 514 (act 518) at T3.

In some configurations, concurrently with the client 504 displaying the partial segment 514, the server 502 is configured to continue recognizing speech in the input audio and generates one or more additional partial segments comprising words and phrases that are recognized subsequent to the words and phrases included in the initial partial segment 514. As each partial segment is generated, the server sends the additional partial segments to the client 504, which receives the additional partial segments. The client 504 is then configured to display each of the additional partial segments in succession. The initial partial segment 514 and subsequent one or more partial segments are displayed without grammatical formatting such as punctuation and/or capitalization. In some instances, the partial segment is appended to the initial segment, while in other instances the additional partial segments are displayed separately from the initial segment.

While the client 504 is receiving and/or displaying the partial segment 514, the server 502 generates a first set of segmentation boundaries and applies those segmentation boundaries to the partial segment 514 and the one or more additional partial segments (act 520). The server then generates a decoder segment (act 522) based on at least the partial segment being segmented/finalized by the first set of segmentation boundaries. The server 502 then generates and applies a punctuation tag for each segmentation boundary included in the first set of segmentation boundaries (act 524). Subsequently, the server 502 generates a formatted segment 530 based on the partial segment 514 and/or the one or more additional partial segments (act 526). The formatted segment 546 is based on the first set of segmentation boundaries, wherein punctuation is generated at the predicted sentence breaks included in the first set of segmentation boundaries.

After generating the formatted segment 546, the server 502 transmits the formatted segment 530 (act 528), at which time (T4), the client 504 receives the formatted segment (act 532). The client is configured to display the formatted segment (act 540). While the client is displaying the formatted segment, the server generates and applies a second set of segmentation boundaries in order to generate a final segment 546 (act 542). The segmentation boundaries are selected in order to generate final segments that correspond to full sentences included in the partial segment 514. Thus, the second set of segmentation boundaries may also be referred to as sentence boundaries. The final segments also comprise punctuation and capitalization based on the segmentation boundaries.

When streaming the final segments to the user, the final segments may comprise one or more full sentences that are batched together (each having their own segmentation boundaries). Alternatively, each sentence may be sent separately from any other complete sentence as a final segment.

After a final segment 546 is generated (act 542), the server transmits the final segment 546 (act 544) to the client 504, which receives the final segment 546 (act 547). The client 504 is then configured to display the final segment 546 (act 548). This process is repeated until the end of the input audio and/or after a predetermined period of silence. The final output comprises full sentences that have been recognized in the input audio.

In some instances, the client 504 compares the second set of segmentation boundaries against the first set of segmentation boundaries in order to determine which set of segmentation boundaries should be used to display either the final segment and/or the full output. If the second set of segmentation boundaries is different than the first set of segmentation boundaries, the display is updated with the final segment 546, such that any portions of the previously displayed/currently displayed formatted segment 530 overlap with the final segment 546 are replaced with the final segment 546. If the second set of segmentation boundaries are not different, the client refrains from updating the display and does not modify the previously displayed/currently displayed formatted segment 530 with the final segment 548. In some instances, the final segment 546 may be based on a combination of one or more segmentation boundaries selected from the first set of segmentation boundaries and one or more segmentation boundaries selected from the second set of segmentation boundaries.

In some instances, the server 502 is configured to generate the final segment 546 (act 542) and subsequently send the final segment 546, wherein the client 504 receives the final segment (act 547). Then, the client 504 is configured to generate a second set of segmentation boundaries and determine which of the segmentation boundaries (either the first set of segmentation boundaries or second set of segmentation boundaries) should be applied (act 548). After the segmentation boundaries have been resolved, the client 504 is configured to display the final segment 546 (act 548).

Attention will now be directed to FIG. 6A-6B which illustrate an example of streaming automatic speech recognition output including partial segments, formatted segments, final segments, and a full output, according to two different segmentation processing and application techniques. FIG. 6A illustrates output transcription data that has not undergone any reformatting based on a second set of segmentation boundaries. This is similar to how some conventional models work. In such embodiments, the final segments have not been evaluated in order to determine if more accurate segmentation boundaries should be applied for generating final sentences. Accordingly, the output is simply viewed as (1) an initial segment 602 (which is a partial segment) and (2) a plurality of consecutive partial segments (e.g., partial segment 604, partial segment 606, partial segment 608), which are consecutively generated as the ASR system recognizes the spoken language utterances in the input speech.

In this embodiment, the system also generates a first set of segmentation boundaries that result in the generation of final segment 610, which comprises a complete sentence "How are you doing?", as well as a sentence fragment, "I was.", based on the partial segment 608. Partial segment 608 comprises the initial segment 602, along with each of the partial segments subsequent to the initial segment including partial segment 604, and partial segment 606. Partial segment 608 also comprises additional words recognized in the input speech (e.g., "i was").

The system continues to recognize spoken language utterances in the input speech and generates more partial segments (e.g., partial segment 612, partial segment 614, partial segment 615). A set of segmentation boundaries is then generated for this set of partial segments in order to generate a final segment 616 which comprises the sentence fragment, "Hoping to catch up with you." Thus, the full output 618 comprises final segment 610 and final segment 616.

The errors in the grammatical segmentation shown in FIG. 6A can be addressed and resolved by utilizing the techniques described herein. For example, as illustrated in FIG. 6B, the system receives input speech and recognizes spoken language utterances in the input speech. The system generates a first partial segment (e.g., initial segment 620) and one or more additional partial segments (e.g., partial segment 622, partial segment 624, partial segment 626) until at least one segmentation boundary is predicted. Then based on the one or more initial segmentation boundaries, the system generates a formatted segment 628 (which is similar to the final segment 610 in FIG. 6A). After generating the formatted segment 628, the system identifies a second set of segmentation boundaries that comprise segmentation boundaries that would produce complete sentences when applied to the partial segments and/or formatted segments.

Here, final segment 630 comprises "How are you doing?" but not "I was" because the first set of segmentation boundaries incorrectly predicted a sentence break after "I was". Thus, while final segment 630 is displayed, the portion of the partial segment 626 comprising "I was" is cached while the system continues to recognize spoken language utterances in the input speech. The system then generates one or more additional partial segments (e.g., partial segment 632, partial segment 634, partial segment 636). Another set of segmentation boundaries is then applied to the latest set of partial segments and/or most recent partial segment in order to generate another formatted segment (e.g., formatted segment 638).

However, when the formatted segment 638 is evaluated, the system determines that the initial segmentation boundaries applied are incorrect, as formatted segment 638 comprises a sentence fragment. Thus, the system retrieves the cached portion that was previously discarded from final segment 630 in order to generate final segment 640 based on a new set of segmentation boundaries, wherein one or more segmentation boundaries are different from one or more segmentation boundaries included in the first set of segmentation boundaries. This new and corrected segmentation can be applied to resolve the errors from the previous segmentation. Thus, once the layered/corrected segmentation is applied, the full output 642 comprises: "How are you doing? I was hoping to catch up with you." which are two correctly formatted complete sentences.

It should be appreciated that, according to some embodiment, whenever a different type of segmentation is displayed to a user, different corresponding visual formatting is used to indicate what corresponding stage of segmentation/processing the transcription data is currently in. For instance, initial segments can be displayed with different formatting than formatted and/or final segments.

The visual formatting includes a combination of type font, type size, type face, color, and other visual font features. For example, as shown in FIGS. 6B, partial segments are displayed in an italicized font, final segments are displayed in a regular type face (i.e., non-italicized), final segments are bold-face, and full output, which comprises the final segments, is underlined and bolded. Different coloring/formatting schemes can also be used, beyond those shown. Furthermore, FIG. 6B shows that each segment is displayed in succession (as they are received/processed), without replacing previous segments. In other embodiments, each new segment that is received, which incorporates content of the previously displayed segment, will replace the previously displayed segment, or at least portions of the previously displayed segment(s) that are incorporated into the newly received/displayed segment. For instance, segment 622 will replace segment 620 on the display, when segment 622 is received/rendered. Likewise, segment 628 will replace the previously displayed segment(s) 626 (which is removed from the display), when segment 628 is displayed. Similarly, the final segment 630 can completely replace the formatted segment 628 in the display when segment 630 is processed/received as a final segment. Alternatively, while not shown, the terms "I was." Can also remain displayed on the user interface after Final segment 630, with a different font, since the term "I was." has not yet been finalized. Once the segment for the terms "I was" is finalized, the font of those terms can dynamically change to reflect their status as finalized.

To facilitate with tracking/rendering different text with different fonts based on their status, the system can send metadata with the segments that reflect which type of segment it is (e.g., an initial segment, partial segment, formatted segment, final segment, etc.) That metadata can be used by the display system to render the content/segments with corresponding fonts according to predetermined display schemes to reflect the processing status of the rendered text.

In some embodiments, the user display has limited dimensions (e.g., a phone display) such that only a selected amount or number of segments will be displayed concurrently to the user on the user device. In such embodiments, the full output (as configured as a complete transcript) may comprise final sentences or reformatted segments that were finalized and formatted with final segmentation/punctuation after it is no longer displayed to the user. Such embodiments can occur, for instance, when there is too much lag in processing/communication to provide the final segments to the rendering system before the corresponding text is scrolled off of the user display. In such instances, the user can scroll up or access a final transcript that includes the final segmentation/formatting (even if they have not previously seen the final segmentation/formatting during the real-time streaming/display of the transcript).

While conventional models display the transcription data in the same visual formatting, embodiments described herein beneficially employ different visual formatting to improve the user experience by helping the user to visually interpret what type of transcription data is being displayed. Thus, the user may be able to determine how much to trust the transcription data. For example, italicized transcription data would indicate to the user that the transcription data is like raw ASR output. The regular type face transcription data would indicate to the user that some formatting and initial segmentation has been applied but may not be entirely accurate since it is the first pass at segmenting and formatting. Bolded transcription data indicates to the user that another round of segmentation boundaries have been applied which generate complete sentences. Thus, the user may have a higher confidence in the accuracy and quality of the bolded transcription data because the bold face indicates that the system has evaluated the initial segmentation boundaries (e.g., as displayed in the formatted segments) and identified improved segmentation boundaries.

This multi-phased approach to generating transcription data is especially beneficial when ASR models are used to recognize and transcribe spoken language utterances from a speaker who speaks with a slow speaking rate. In some instances, initial segmentation boundaries are predicted based on pauses, where typically, if a speaker pauses, the system assumes a segmentation boundary should be applied (i.e., that it's the end of a sentence). However, with slow speakers, there may be many pauses which are not indicative of actual sentence breaks but are just part of the speaker's speaking style.

Figure 6C:
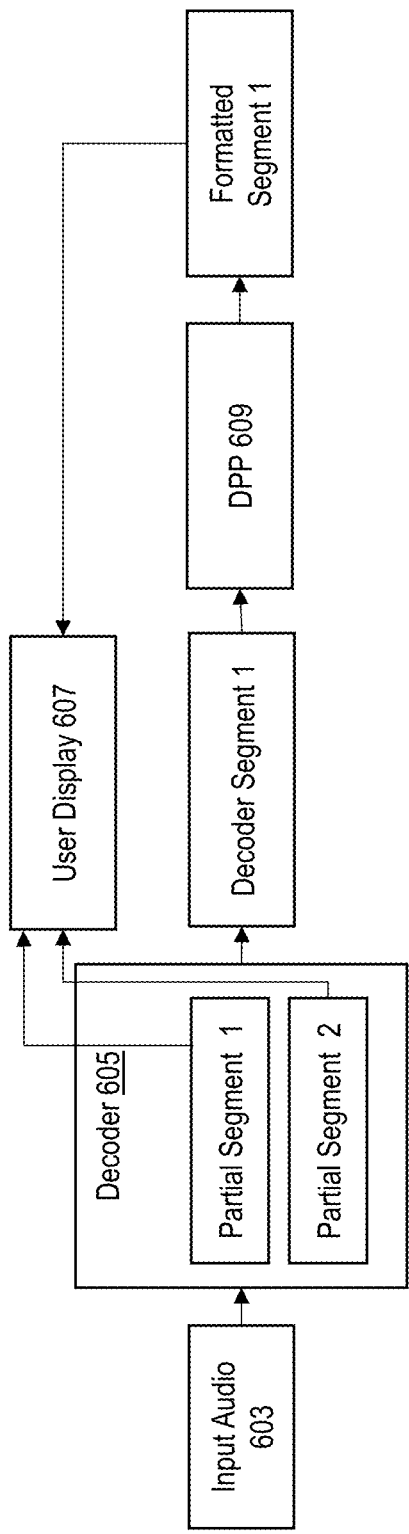
FIGS. 6C-6D illustrate an example embodiment for generating a final sentence based on a confidence level that a new sentence has started.
Figure 6D:
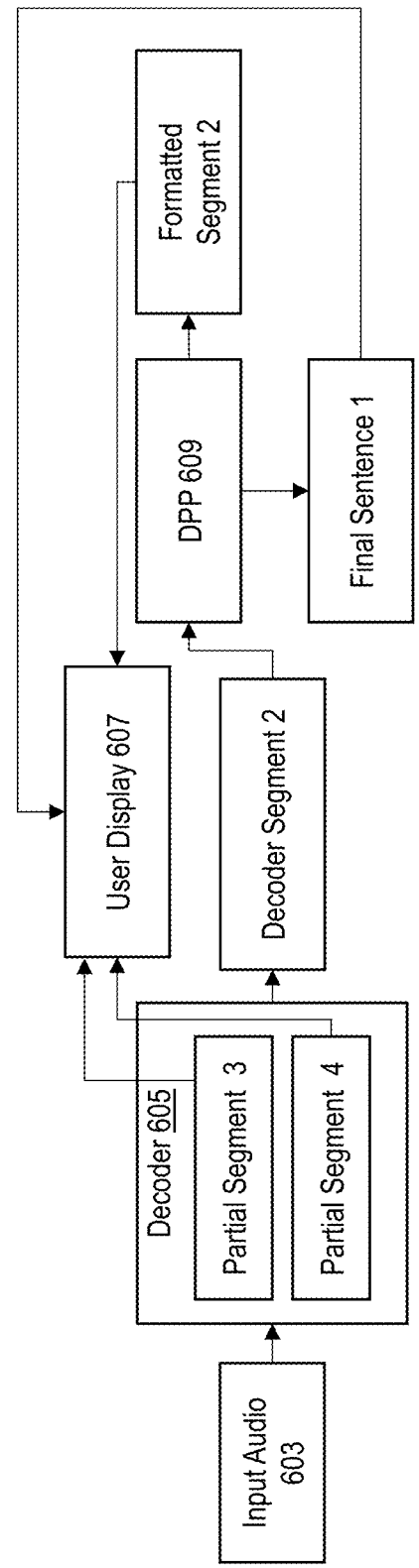

Attention will now be directed to FIGS. 6C-6D which illustrate an example embodiment for generating a final sentence as part of a phased transcription process. For example, FIG. 6C illustrates input audio 603 being used as input data for the decoder 605 (i.e., the decoder 605 is applied to the input audio 603). As the decoder recognizes speech in the input audio 603, the decoder 605 generates one or more partial segments (e.g., partial segment 1 and partial segment 2) which are transmitted one by one to the user display 607. A first set of segmentation boundaries is applied to the partial segments such that the decoder 605 generates a decoder segment (e.g., decoder segment 1). This decoder segment 1 is transmitted to the display post processor 609 which generates formatted segment 1 based on decoder segment 1. While the formatted segment 1 is transmitted to the user display 607, decoder segment 1 is cached in the display post processor 609.

Subsequent to formatted segment 1 being transmitted to and displayed on the user display 607, the decoder 605 continues to consume and process input audio 603. The decoder 605 generates additional/new partial segments (e.g., partial segment 3 and partial segment 4). Another first set of segmentation boundaries associated with the new partial segments is applied to partial segment 3 and partial segment 4, such that the decoder 605 generates a second decoder segment (e.g., decoder segment 2). Decoder segment 2 is transmitted to the display post processor 609, wherein the display post processor 609 generates a second set of segmentation boundaries associated with decoder segment 1 based on "looking ahead" to decoder segment 2.

Based on the words and phrases included in decoder segment 2, the display post processor 609 is configured to predict whether a new sentence starts within decoder segment 1. This new sentence prediction is associated with a new sentence confidence score (i.e., how likely the new sentence prediction reflects an actual sentence break). If the new sentence confidence score equals or exceeds a predetermined confidence score threshold, a final segmentation boundary is generated as part of a second set of segmentation boundaries such that a final sentence (e.g., final sentence 1) is generated and transmitted to the user display 607. After the final sentence is transmitted to the user display, the new partial segments (e.g., partial segment 3 and partial segment 4) are also transmitted to the user display. The formatted segment 2 is also transmitted to the user display.

Figure 7:
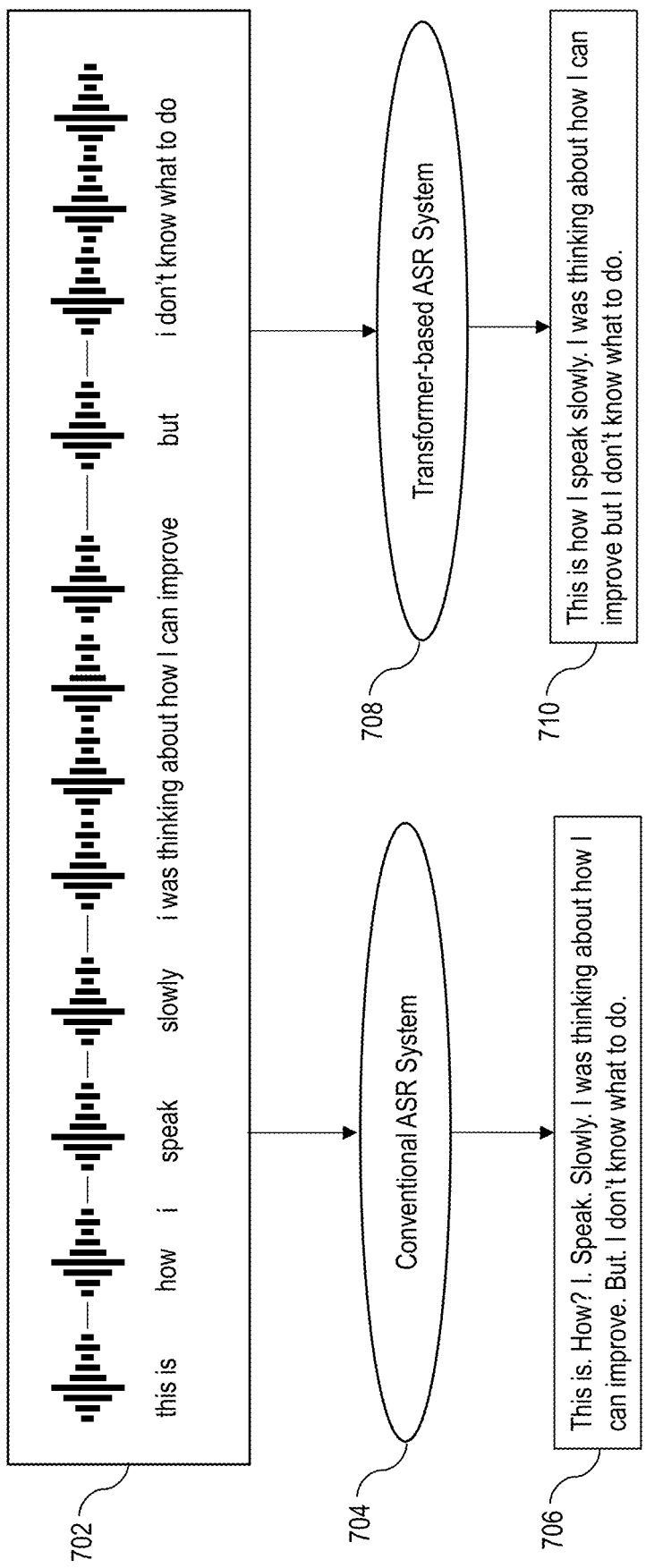
FIG. 7 illustrates an example embodiment of a comparison between transcription results generated by a conventional model versus the present invention, particularly when receiving speech from a speaker with a slow speaking rate.

Attention will now be directed to FIG. 7, which illustrates an example embodiment of a comparison between transcription results generated by a conventional model versus the present invention, particularly when receiving speech from a speaker with a slow speaking rate. FIG. 7 illustrates an example input speech corresponding to a speaker with a slow speaking rate. For example, input speech 702 comprises the words "this is how I speak slowly i was thinking about how i can improve but i don't know what to do". These words are separated by various different pauses, which are represented by the straight lines in between the sound wave icons. A conventional ASR system 704 would generate a first set of segmentation boundaries based, at least in part, on the pauses (i.e., silence in the input speech 702). The transcription output 706 would then comprise incorrectly formatted sentence fragments (e.g., "This is. How? I. Speak. Slowly. I was thinking about how I can improve. But. I don't know what to do.")

However, while the transformer-based ASR system 708 may initially predict similar segmentation boundaries in the first set of segmentation boundaries, the system 708 would also identify a second set of segmentation boundaries which are configured as sentence breaks. Thus, output 710 comprises correctly formatted complete sentences (e.g., "This is how I speak slowly. I was thinking about how I can improve but I don't know what to do.")

Attention will now be directed to FIG. 8, which illustrates an example embodiment of a flow diagram having a plurality of acts for generating phased transcription data for input audio data (i.e., speech data). The speech data consumed by the ASR model is configurable in different formats, including a previously recorded audio data and/or a streaming audio dataset.

For example, FIG. 8 illustrates a flow diagram 800 that includes various acts (act 810, act 820, act 830, act 840, and act 850) associated with exemplary methods that can be implemented by computing system 110 for first generating formatted speech recognition output and subsequently generating re-formatted speech recognition output.

The first illustrated act (act 810) includes generating one or more decoder segments of the one or more spoken language utterances based on a first set of segmentation boundaries which are configured as temporary segmentation boundaries (act 810). Each decoder segment comprises one or more consecutive words recognized in the speech data. The first set of segmentation boundaries are generated using smart audio segmentation and/or time-out-based logic. These segmentation techniques beneficially provide for generating decoder segments with low latency such that the decoder segments include some segmentation information while still being able to be generated and transmitted quickly to the display post processor. The segmentation boundaries in the first set of segmentation boundaries are beneficially configured to be temporary or soft boundaries such that a more robust segmentation model may be applied to override any incorrectly predicted sentence breaks.

Systems are also configured to generate one or more formatted segments based on the one or more decoder segments by assigning a punctuation tag selected from a plurality of punctuation tags at each segmentation boundary included in the first set of segmentation boundaries (act 820). Because the decoder segments already have been segmented according to the first set of segmentation boundaries, the display post processor is able to automatically assign a punctuation tag at each segmentation boundary without having to determine or evaluate any segmentation boundaries. This reduces the latency in generating the formatted segments which are transmitted to the user display. This in turn improves the user experience, particularly in streaming scenarios, where the user benefits from viewing formatted transcription data (i.e., the formatted transcription data is easier to read and understand).

Subsequent to and/or simultaneous with generating the one or more formatted segments, the systems are configured to generate a second set of segmentation boundaries such that at least one segmentation boundary included in the second set of segmentation boundaries is determined to be a final segmentation boundary corresponding to an end of a sentence included in the one or more spoken language utterances (act 830). This second set of segmentation boundaries are configured as hard segmentation boundaries which are capable of overriding the soft segmentation boundaries included in the first set of segmentation boundaries. Additionally, the segmentation boundaries included in the second set of segmentation boundaries beneficially correspond to sentence breaks which segment the one or more decoder segments into complete sentences.

Subsequent to generating the second set of segmentation boundaries, the systems apply the second set of segmentation boundaries to the one or more decoder segments (act 840). In response to applying the second set of segmentation boundaries to the one or more decoder segments, the systems generate one or more final sentences from the one or more decoder segments (act 850). By implementing systems in this manner, the transcription data is further improved by the display post processor generating full sentences which have been formatted, along with the previously generated formatted segments. Because the final segments are sentences, the transcription data is further improved in accuracy and readability. Furthermore, because the final segments are complete sentences, the punctuation and capitalization applied to the final segments are improved. This also improves output from further downstream applications that are applied to the final segments, including machine translation.

Applying the second set of segmentation boundaries and generating one or more final sentences comprises at least one of: deleting segmentation boundaries included in the first set of segmentation boundaries that do not correspond to segmentation boundaries included in the second set of segmentation boundaries, retaining segmentation boundaries in the first set of segmentation boundaries that correspond to segmentation boundaries in the second set of segmentation boundaries, or adding segmentation boundaries included in the second set of segmentation boundaries that do not correspond to segmentation boundaries in the first set of segmentation boundaries.

The one or more decoder segments collectively comprise one or more sentences. Thus, each final sentence included in the final segments corresponds to a different complete sentence included in the one or more decoder segments. As described above, having transcription data formatted as complete sentences improves the user experience by providing transcription data that contains correct grammatical formatting and improves the output of downstream applications that are applied to the final segments.

The second set of segmentation boundaries also includes a set of punctuation tags such that each punctuation tag included in the set of punctuation tags corresponds to a segmentation boundary included in the second set of segmentation boundaries. In this manner, applying the second set of segmentation boundaries simultaneously applies the set of punctuation tags. This reduces the latency in generating the final segments.

Prior to generating at least one decoder segment, the systems are configured to generate one or more partial segments. Each partial segment comprises one or more words which are recognized in the speech data, and which are appended to a previously generated partial segment. In such configurations, the at least one decoder segment is generated by applying the first set of segmentation boundaries to the one or more partial segments.

It should be appreciated that while the first set of segmentation boundaries is generated and applied to the one or more decoder segments prior to assigning punctuation tags, the second set of segmentation boundaries is generated and applied to the one or more decoder segments simultaneously with applying punctuation tags to the one or more decoder segments. On the one hand, the first set of segmentation boundaries are generated more quickly than the second set of segmentation boundaries. Additionally, the because the decoder segments are already segmented according to the first set of segmentation boundaries, punctuation is able to be quickly applied to the one or more decoders in order to generate the one or more formatted segments. In this manner, the user is able to view formatted transcription data with low latency. However, the formatted segments may have some punctuation errors based on errors propagated by incorrect segmentation boundaries included in the first set of segmentation boundaries.

In contrast, the second set of segmentation boundaries are generated by a more robust machine learning model than the first set of segmentation boundaries. Thus, segmentation and grammatical formatting have a higher latency than when generating and applying the first set of segmentation boundaries. However, this is mitigated because the transformer punctuation model is able to generate segmentation boundaries and corresponding punctuation at the same time. Additionally, the segmentation boundaries in the second set of segmentation boundaries segment the one or more decoder segments into complete sentences that also have correct grammatical formatting. Thus, while the formatted segments are generated more quickly than the final segments, the final segments have improved segmentation and punctuation over the formatted segments. Users experience an enhanced transcription process because they benefit from the low latency of being able to view formatted transcription data quickly (i.e., the formatted segments) and then being able to view re-formatted transcription data that is higher quality and retroactively replaces formatted segments that contained errors propagated from the first set of segmentation boundaries.

Figure 9:
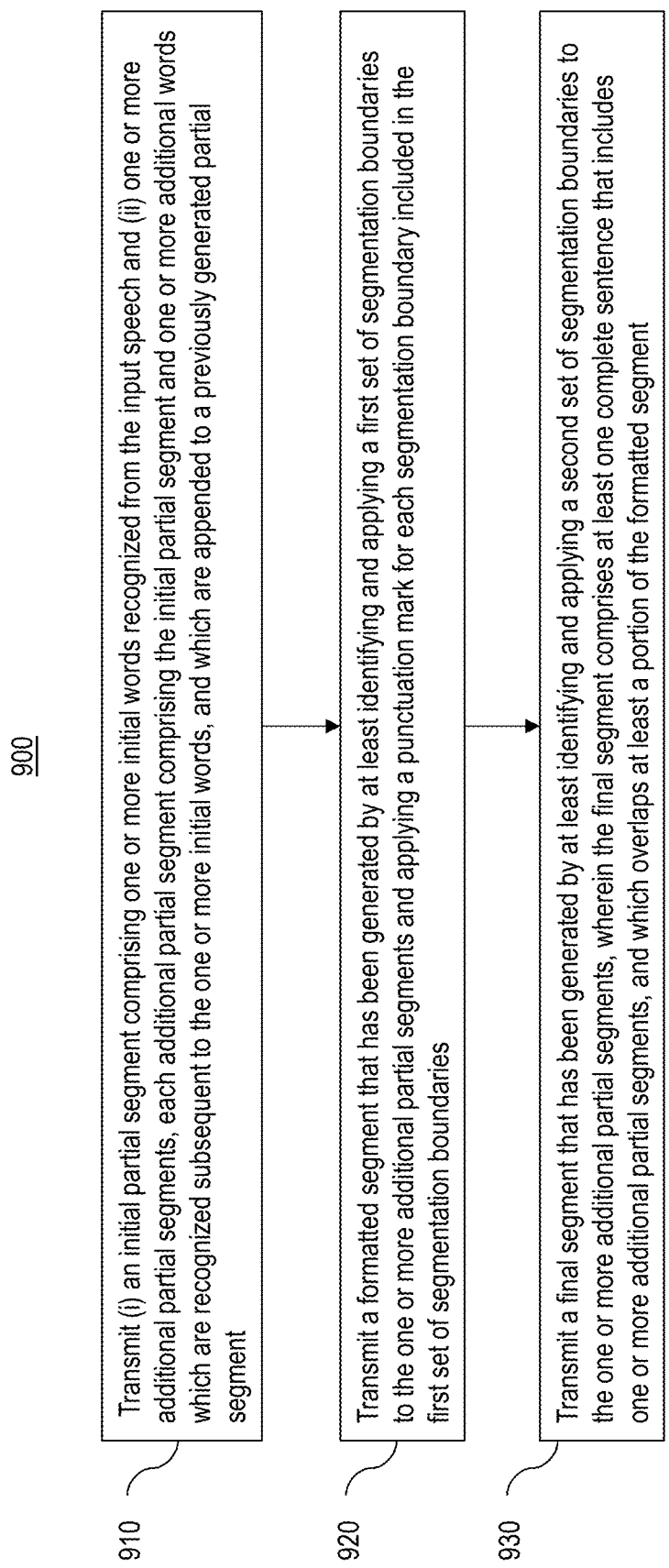
FIG. 9 illustrates an example embodiment of a diagram having a plurality of components for generating and transmitting phased transcription data.

Attention will now be directed to FIG. 9, which illustrates an example embodiment of a flow diagram having a plurality of acts for transmitting phased transcription data for input audio data (i.e., speech data).

For example, FIG. 9 illustrates a flow diagram 900 that includes various acts (act 910, act 920, and act 930) associated with exemplary methods that can be implemented by computing system 110 for first transmitting formatted speech recognition output and subsequently transmitting re-formatted speech recognition output.

The first illustrated act (act 910) includes transmitting (i) an initial partial segment comprising one or more initial words recognized from the input speech and (ii) one or more additional partial segments. Each additional partial segment comprises the initial partial segment and one or more additional words which are recognized subsequent to the one or more initial words. These one or more additional words are appended to a previously generated partial segment. Each partial segment is transmitted to a client device one by one in the order in which each partial segment is generated. In this manner, the user is able to view, in real-time, transcription data for the input speech. Even though these partial segments do not have any formatting, the user experience is still improved by having immediate access to transcription data for streaming input audio.

The systems are also configured to transmit a formatted segment that has been generated by at least identifying and applying a second set of segmentation boundaries to the one or more additional partial segments and applying a punctuation mark to each segmentation boundary included in the first set of segmentation boundaries (act 920). The punctuation marks are easily and quickly applied because of the previously identified segmentation boundaries. This further improves the user experience by providing formatted transcription data with low latency.

Finally, the systems are configured to transmit a final segment that has been generated by at least identifying and applying a second set of segmentation boundaries to the one or more additional partial segments (act 930). The final segment comprises at least one complete sentence that includes one or more additional partial segments. The final segment also overlaps at least a portion of the formatted segment.

By implementing systems in this manner, many technical benefits are achieved. For example, while the formatted segments are generated more quickly than the final segments, the final segments have improved segmentation and punctuation over the formatted segments. Users experience an enhanced transcription process because they benefit from the low latency of being able to view formatted transcription data quickly (i.e., the formatted segments) and then being able to view re-formatted transcription data that is higher quality and retroactively replaces formatted segments that contained errors propagated from the first set of segmentation boundaries.

The system are also beneficially configured to generate and apply each of: (i) a first visual formatting for rendering the initial partial segment and the one or more additional partial segments, (ii) a second visual formatting that is different than the first visual formatting and that is used for rendering the formatted segment, and (iii) a third visual formatting that is different than the first visual formatting and second visual formatting and that is used for rendering the final segment.

While conventional models display the transcription data in the same visual formatting, embodiments described herein beneficially employ different visual formatting to improve the user experience by helping the user to visually interpret what type of transcription data is being displayed. Thus, the user may be able to determine how much to trust the transcription data and have a higher confidence in the accuracy and quality of the bolded transcription data because the third visual formatting indicates that the system has evaluated the initial segmentation boundaries (e.g., as displayed in the formatted segments) and identified and applied improved segmentation boundaries and punctuation.

After the systems have consumed the entire input audio data, the systems are configured to transmit a final transcript comprising one or more final segments associated with the input speech, each final segment comprising a sentence associated with a particular spoken language utterance included in the input speech. In some instances, for example, where the user display is limited, the final transcript comprises at least one re-formatted segment that corresponds to a particular formatted segment that had been previously transmitted by the computer system.

Figure 10:
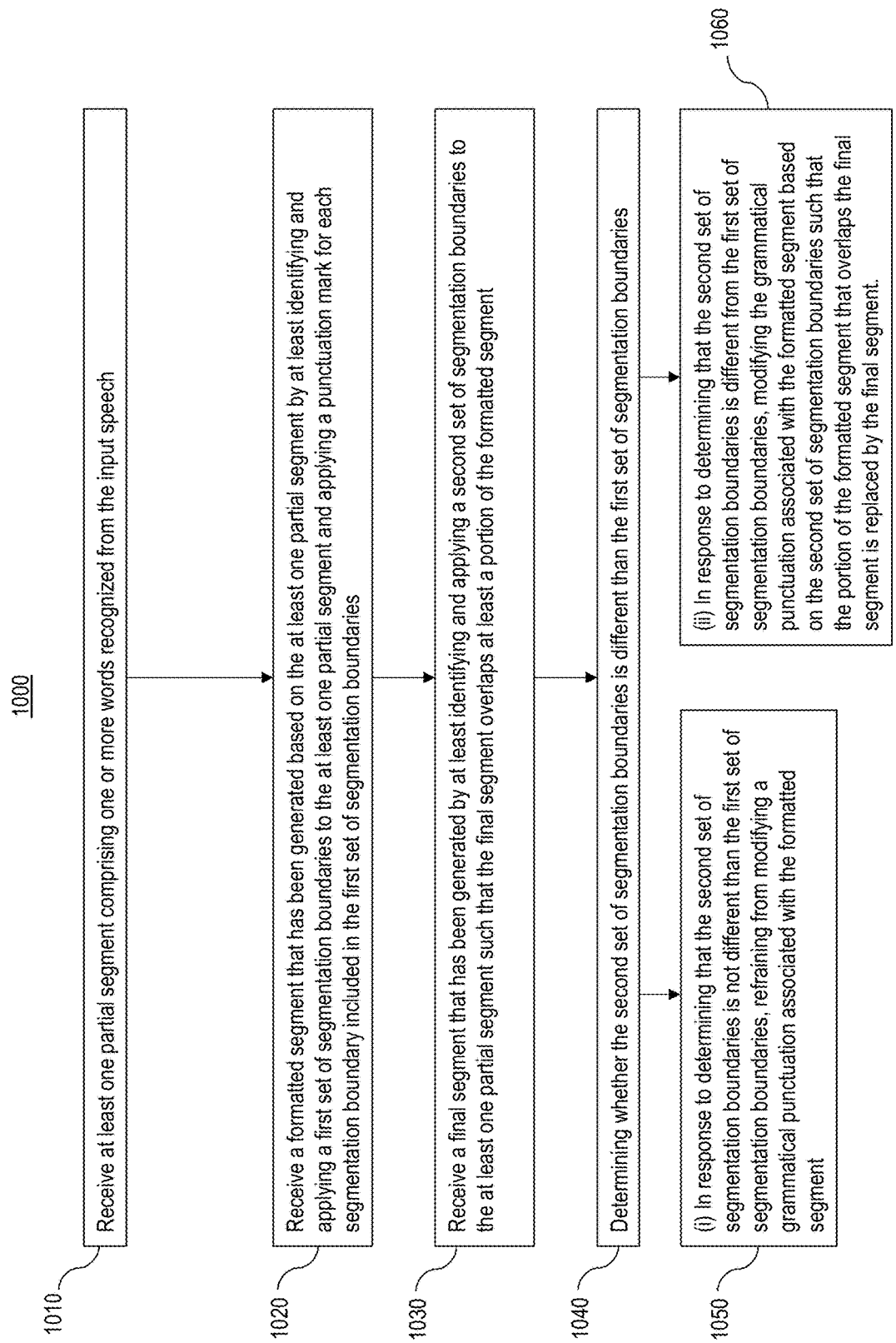
FIG. 10 illustrates an example embodiment of a flow diagram having a plurality of acts for receiving and displaying phased transcription data.

Attention will now be directed to FIG. 10, which illustrates an example embodiment of a flow diagram having a plurality of acts for transmitting phased transcription data for input audio data (i.e., speech data).

For example, FIG. 10 illustrates a flow diagram 1000 that includes various acts (act 1010, act 1020, act 1030, act 1040, act 1050, and act 1060) associated with exemplary methods that can be implemented by computing system 110 for first transmitting formatted speech recognition output and subsequently transmitting re-formatted speech recognition output.

The first illustrated act (act 1010) includes receiving at least one partial segment comprising one or more words recognized from the input speech. Each partial segment is transmitted to a client device one by one in the order in which each partial segment is generated. In this manner, the user is able to view, in real-time, transcription data for the input speech. Even though these partial segments do not have any formatting, the user experience is still improved by having immediate access to transcription data for streaming input audio.

The systems are also configured to receive a formatted segment that has been generated based on the at least one partial segment by at least identifying a first set of segmentation boundaries associated with the at least one partial segment and generating a punctuation mark for each segmentation boundary included in the first set of segmentation boundaries (act 1020). This reduces the latency in generating the formatted segments which are transmitted to the user display. This in turn improves the user experience, particularly in streaming scenarios, where the user benefits from viewing formatted transcription data (i.e., the formatted transcription data is easier to read and understand).

Subsequent to receiving the formatted segment, the systems receive a final segment that has been generated by at least identifying a second set of segmentation boundaries associated with the at least one partial segment, wherein the final segment overlaps at least a portion of the formatted segment (act 1030). The systems are further configured to determine whether the second set of segmentation boundaries is different than the first set of segmentation boundaries. Finally, in response to determining that the second set of segmentation boundaries is not different than the first set of segmentation boundaries, the systems either refrain from modifying a grammatical punctuation associated with the formatted segment, or alternatively, in response to determining that the second set of segmentation boundaries is different from the first set of segmentation boundaries, the systems modifying the grammatical punctuation associated with the formatted segment based on the second set of segmentation boundaries. In these embodiments, the portion of the formatted segment that overlaps the final segment is replaced by the final segment.

With regard to the foregoing, it will also be appreciated that some embodiments include selectively modifying the grammatical punctuation associated with the formatted segment based on a determination of whether the second set of segmentation boundaries is different from the first set of segmentation boundaries.

In such embodiments, the system may selectively modify the grammatical punctuation by adding a grammatical punctuation mark or deleting a punctuation mark associated with the formatted segment based on determining that the second set of segmentation boundaries is different from the first set of segmentation boundaries.

Alternatively, or additionally, the selectively modification of the grammatical punctuation may also include leaving existing grammatical punctuation associated with the formatted segment unmodified as long as it is determined that the second set of segmentation boundaries is the same as the first set of segmentation boundaries and refraining from making any changes until it is determined that the second set of segmentation boundaries is different than the first set of segmentation boundaries.

The systems are also configured dynamically update a rendering of a user display by sequentially displaying the at least one partial segment, followed by a display of the formatted segment, and followed by a display of the final segment. The systems also utilize the display to visually distinguish between the different segment data. For example, the at least one partial segment and one or more additional partial segments are displayed in a first visual format that indicates to a user that the transcription data being displayed on the user display are partial segments. The formatted segments are displayed in a second visual format that indicates to the user that the transcription data being displayed on the user display are formatted segments, and the final segment is displayed in a third visual format that indicates to the user that the transcription data being displayed on the user display are final segments. By performing these processes, it is possible to effectively stream the transcribed content back to the user, dynamically, in real-time, as the segments are created and the punctuation is applied and/or corrected.

Additionally, in some embodiments, once the entire input audio data has been consumed, the system generates a final transcript for the input speech comprising one or more final segments that have been received by the computer system. In some circumstances where a user may not have been able to view all of the formatted and/or re-formatted transcription data, the final transcript comprises at least one re-formatted segment of input speech and wherein re-formatted segments of the input speech are visually distinguished at a client system from segments of the input speech that are displayed prior to being re-formatted. In the transcript, the re-formatted segments of the input speech are visually distinguished with at least one of a different color scheme, or font type, than segments of the input speech that are displayed prior to being reformatted.

Additionally, the systems are configured to transmit the final segments and/or the transcript to a machine translation system. For example, the system is configured to transmit the final transcript to a multi-lingual translation system that is configured to generate translations of transcripts from a first language to at least one second language. The multi-lingual translation system then translates the final transcript from the first language into the at least one second language.

By implementing ASR processing in this manner, the grammatical/punctuation accuracy of the transcription data is improved, thereby facilitating more accurate downstream ASR processes (e.g., translations). This accuracy also improves the overall user experience, by enabling the user to read more grammatically correct transcripts and by also providing users visual cues about the processing/finalization status of the transcript contents.

Additionally, the disclosed systems enable the generation of low latency transcription data for slow and/or hesitant speakers, without applying erroneous time-out breaks that cause permeant sentence fragments in the resulting transcript. Instead, the disclosed systems are able to contemporaneously generate and send, with relatively low lag time, updated transcription data with corrected segmentation boundaries for formatting the final sentences in the transcript.

Thus, disclosed embodiments enable transcribing speech services in which layered/phased transcription data is generated and dynamically applied to verify and/or re-format real-time transcription data, and without delaying the rendering of the transcribed data as it is processed.

Example Computing Systems

Embodiments of the present invention may comprise or utilize a special purpose or general-purpose computer (e.g., computing system 110) including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media (e.g., hardware storage device(s) 140 of FIG. 1) that store computer-executable instructions (e.g., computer-readable instructions 118 of FIG. 1) are physical hardware storage media/devices that exclude transmission media. Computer-readable media that carry computer-executable instructions or computer-readable instructions (e.g., computer-readable instructions 118) in one or more carrier waves or signals are transmission media. Thus, by way of example, and not limitation, embodiments of the invention can comprise at least two distinctly different kinds of computer-readable media: physical computer-readable storage media/devices and transmission computer-readable media.

Physical computer-readable storage media/devices are hardware and include RAM, ROM, EEPROM, CD-ROM or other optical disk storage (such as CDs, DVDs, etc.), magnetic disk storage or other magnetic storage devices, or any other hardware which can be used to store desired program code means in the form of computer-executable instructions or data structures and which can be accessed by a general purpose or special purpose computer.

A "network" (e.g., network 130 of FIG. 1) is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry, or desired program code means in the form of computer-executable instructions or data structures, and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for generating transcription data for speech data comprising one or more spoken language utterances, the method comprising:
   generating one or more partial segments of the one or more spoken language utterances, each partial segment comprising one or more words recognized in the speech data;
   causing the one or more partial segments to be transmitted to and displayed at a remote client device in a first visual format corresponding to a first font style that indicates to a user that the transcription data being displayed on a user display are partial segments;
   generating one or more decoder segments based on the one or more partial segments and a first set of segmentation boundaries, each decoder segment comprising one or more-consecutive words recognized in the speech data;
   generating one or more formatted segments with punctuation based on the one or more decoder segments by assigning a punctuation tag selected from a plurality of punctuation tags at each segmentation boundary included in the first set of segmentation boundaries;
   causing the one or more formatted segments to be transmitted to and displayed at the remote client device in a second visual format corresponding to a second font style, different than the first font style, that indicates to the user that the transcription data being displayed on the user display are formatted segments;
   subsequent to the one or more formatted segments being transmitted to the remote client device, generating a second set of segmentation boundaries such that at least one segmentation boundary included in the second set of segmentation boundaries is determined to be a final segmentation boundary corresponding to an end of a sentence included in the one or more spoken language utterances;
   applying the second set of segmentation boundaries to the one or more decoder segments, the second set of segmentation boundaries being different than the first set of segmentation boundaries;
   in response to applying the second set of segmentation boundaries to the one or more decoder segments, generating one or more final sentences from the one or more decoder segments, wherein the one or more final sentences have different punctuation than the punctuation of the one or more formatted segments; and
   causing the one or more final sentences to be transmitted to and displayed at the remote client device in a third visual format corresponding to a third font style, different from the first font style and the second font style, that indicates to the user that the transcription data being displayed on the user display are final sentences.

2. The method of claim 1, wherein applying the second set of segmentation boundaries and generating one or more final sentences comprises at least one of:
   deleting segmentation boundaries included in the first set of segmentation boundaries that do not correspond to segmentation boundaries included in the second set of segmentation boundaries,
   retaining segmentation boundaries in the first set of segmentation boundaries that correspond to segmentation boundaries in the second set of segmentation boundaries, or
   adding segmentation boundaries included in the second set of segmentation boundaries that do not correspond to segmentation boundaries in the first set of segmentation boundaries.

3. The method of claim 1, wherein the one or more decoder segments collectively comprise one or more sentences, and wherein each final sentence included in the one or more final sentences corresponds to a complete sentence included in the one or more decoder segments.

4. The method of claim 1, wherein the second set of segmentation boundaries includes a set of punctuation tags such that each punctuation tag included in the set of punctuation tags corresponds to a segmentation boundary included in the second set of segmentation boundaries.

5. The method of claim 1, wherein the speech data is a previously recorded audio dataset.

6. The method of claim 1, wherein the speech data is a streaming audio dataset.

7. The method of claim 6, further comprising:
   prior to generating at least one decoder segment, generating one or more partial segments, each partial segment comprising one or more words which are recognized in the speech data, and which are appended to a previously generated partial segment, wherein the at least one decoder segment is generated by applying the first set of segmentation boundaries to the one or more partial segments.

8. The method of claim 1, wherein the first set of segmentation boundaries is generated and applied to the one or more decoder segments prior to assigning punctuation tags, and wherein the second set of segmentation boundaries is generated and applied to the one or more decoder segments simultaneously with applying punctuation tags to the one or more decoder segments.

9. A computer system configured to generate and transmit transcription data for input speech recognized by an automatic speech recognitions system, said computer system comprising:
   one or more processors; and one or more computer-readable hardware storage devices that store instructions that are executable by the one or more processors to cause the computer system to at least:

transmit to a remote client device (i) an initial partial segment comprising one or more initial words recognized from the input speech and (ii) one or more additional partial segments, each additional partial segment comprising the initial partial segment and one or more additional words which are recognized subsequent to the one or more initial words, and which are appended to a previously generated partial segment;

generate and transmit to the remote client device for display in a first visual format corresponding to a first font style for rendering the initial partial segment and one or more additional partial segments;

transmit to the remote client device a formatted segment with punctuation that has been generated by at least identifying and applying a first set of segmentation boundaries to the one or more additional partial segments and applying a punctuation mark to each segmentation boundary included in the first set of segmentation boundaries;

generate and transmit to the remote client device for display in a second visual format corresponding to a second font style for rendering the formatted segments, the second font style being different than the first font style;

transmit to the remote client device a final segment that has been generated by at least identifying and applying a second set of segmentation boundaries to the one or more additional partial segments, wherein the final segment comprises at least one complete sentence that includes one or more additional partial segments, and which overlaps at least a portion of the formatted segment, the final segment having second different punctuation than the punctuation of the formatted segment;

generate and transmit to the remote client device for display in a third visual format corresponding to a third font style for rendering the final segment, the third font style being different than the first font style and the second font style.

10. The computer system of claim 9, wherein the instructions are further executable by the one or more processors to further configure the computer system to:

transmit a final transcript comprising one or more final segments associated with the input speech, each final segment comprising a sentence associated with a particular spoken language utterance recognized in the input speech; and cause the remote client device to subsequently display the final transcript in a fourth visual format corresponding to a fourth font style for rendering the final transcript, the fourth font style being different than the first font style, the second font style, and the third font style.

11. The computer system of claim 10, wherein the final transcript comprises at least one re-formatted segment that corresponds to a particular formatted segment that had been previously transmitted by the computer system.

12. A computer system configured to receive transcription data for input speech recognized by an automatic speech recognitions system, said computer system comprising:

one or more processors; and one or more computer-readable hardware storage devices that store instructions that are executable by the one or more processors to cause the computer system to at least:

receive at least one partial segment comprising one or more words recognized from the input speech;

cause the at least one partial segment to be displayed at a remote client device in a first visual format corresponding to a first font style;

receive a formatted segment with punctuation that has been generated based on the at least one partial segment by at least identifying and applying a first set of segmentation boundaries to the at least one partial segment and applying a punctuation mark to each segmentation boundary included in the first set of segmentation boundaries;

cause the formatted segment to be displayed at the remote client device in a second visual format corresponding to a second font style that is different than the first font style;

receive a final segment that has been generated by at least identifying and applying a second set of segmentation boundaries to the at least one partial segment, wherein the final segment overlaps at least a portion of the formatted segment;

cause the final segment to be displayed at the remote client device in a third visual format corresponding to a third font style that is different than the first font style and the second font style;

determining whether the second set of segmentation boundaries is different than the first set of segmentation boundaries; and selectively modifying the grammatical punctuation associated with the formatted segment based on the determination that the second set of segmentation boundaries is different from the first set of segmentation boundaries and generating one or more final sentences having different punctuation than the formatted segment.

13. The computer system of claim 12, wherein the instructions are further executable by the one or more processors to further configure the computer system to:

cause a full output comprising the one or more final sentences to be displayed at the remote client device in a fourth visual format corresponding to a fourth font style different than the first font style, the second font style, and the third font style; and dynamically update a rendering of a user display of the user client device by sequentially displaying the at least one partial segment in the first visual format, followed by a display of the formatted segment in the second visual format, followed by a display of the final segment in the third visual format, and followed by a display of the one or more final sentences in the fourth visual format.

14. The computer system of claim 13, wherein:

the display of the at least one partial segment in the first font style that indicates to a user that the transcription data being displayed on the user display are partial segments;

the display of the formatted segment in the second font style that indicates to the user that the transcription data being displayed on the user display are formatted segments that have undergone a first phase of formatting;

the display of the final segment in the third font style that indicates to the user that the transcription data being displayed on the user display are final segments that have undergone a secondary phase of formatting; and the display of the full output in the fourth font style that indicates to the user that the transcription data being displayed on the user display are the final output comprising the one or more final sentences.

15. The computer system of claim 12, wherein the instructions are further executable by the one or more processors to further configure the computer system to:

generate a final transcript for the input speech comprising one or more final segments that have been received by the computer system.

16. The computer system of claim 15, wherein the final transcript comprises at least one re-formatted segment of input speech and wherein re-formatted segments of the input speech are visually distinguished at a client system from segments of the input speech that are displayed prior to being re-formatted.

17. The computer system of claim 16, wherein the re-formatted segments of the input speech are visually distinguished with at least one of a different color scheme, or font type, than segments of the input speech that are displayed prior to being reformatted.

18. The computer system of claim 15, wherein the instructions are further executable by the one or more processors to further configure the computer system to:

transmit the final transcript to a multi-lingual translation system that is configured to generate translations of transcripts from a first language to at least one second language.

19. The computer system of claim 18, wherein the instructions are further executable to cause the multi-lingual translation system to translate the final transcript from the first language into the at least one second language.

20. The computer system of claim 12, wherein the selectively modifying the grammatical punctuation includes adding a grammatical punctuation mark in response to determining the second set of segmentation boundaries is different than the first set of segmentation boundaries.

21. The computer system of claim 12, wherein the selectively modifying the grammatical punctuation includes determining that the second set of segmentation boundaries is the same as the first set of segmentation boundaries and leaving existing grammatical punctuation associated with the formatted segment unmodified.

22. The method of claim 1, wherein the first font style, the second font style, and the third font style include one or more of a different type font, a different type size, a different type face, or a different font color.

23. The method of claim 1, wherein the method further includes:

causing the remote client device to display a full output comprising one or more final sentences in a fourth visual format corresponding to a fourth font style, different from the first font style, the second font style, and the third font style, that indicates to the user that the transcription data being displayed on the user display are the full output of the one or more final sentences.

* * * * *